United States Patent [19]
Patterson

[11] Patent Number: 5,632,313
[45] Date of Patent: May 27, 1997

[54] LIQUID CHEMICAL MEASURING AND DISTRIBUTION SYSTEM

[75] Inventor: David R. Patterson, Fort Wayne, Ind.

[73] Assignee: Murray Equipment, Inc., Fort Wayne, Ind.

[21] Appl. No.: 470,444

[22] Filed: Jun. 6, 1995

Related U.S. Application Data

[62] Division of Ser. No. 162,530, Dec. 3, 1993, Pat. No. 5,450,881.

[51] Int. Cl.$^6$ .............................. B65B 31/00; B67C 3/00
[52] U.S. Cl. .................. 141/18; 141/198; 222/67
[58] Field of Search ................ 141/4, 18, 40–43, 141/47–49, 51, 65, 66, 95, 198, 50, 98; 222/67; 73/224, 319, 320

[56] References Cited

U.S. PATENT DOCUMENTS

| | | | |
|---|---|---|---|
| 969,090 | 8/1910 | Culbertson | 222/67 |
| 1,419,880 | 6/1922 | Mauclere | 141/18 |
| 1,925,248 | 9/1933 | Hill | 221/100 |
| 2,221,487 | 11/1940 | Moore | 221/116 |
| 2,526,784 | 10/1950 | Walker | 73/319 |
| 2,563,930 | 8/1951 | Hamann | 222/67 |
| 2,600,518 | 6/1952 | Ruth | 248/180 |
| 2,614,742 | 10/1952 | Price | 226/113 |
| 3,386,175 | 6/1968 | Stockman | 33/174 |
| 3,455,346 | 7/1969 | Stork | 141/42 |
| 3,592,385 | 7/1971 | Smith | 239/10 |
| 3,763,570 | 10/1973 | Andersen | 33/370 |
| 3,940,063 | 2/1976 | Baumgartner | 239/70 |
| 3,976,087 | 8/1976 | Bolton | 137/15 |
| 4,148,610 | 4/1979 | Miller, Jr. | 141/7 |
| 4,344,469 | 8/1982 | Brown | 141/90 |
| 4,640,461 | 2/1987 | Williams | 239/317 |
| 4,690,179 | 9/1987 | Bleth | 137/625.21 |
| 4,697,739 | 10/1987 | McCracken | 239/123 |
| 4,714,088 | 12/1987 | Ivins | 37/426 |
| 4,714,196 | 12/1987 | McEachern | 239/62 |
| 4,721,245 | 1/1988 | Van Zweeden | 239/10 |
| 4,726,526 | 2/1988 | Ostergaard | 239/318 |
| 4,741,368 | 5/1988 | Crumby | 141/18 |
| 4,869,301 | 9/1989 | Ohmi | 141/98 |
| 4,925,096 | 5/1990 | Gill | 239/10 |
| 4,945,955 | 8/1990 | Murphy | 141/65 |
| 4,976,295 | 12/1990 | Clusserath | 141/40 |
| 5,002,154 | 3/1991 | Chen | 194/1.5 |
| 5,199,472 | 4/1993 | Rollison | 141/65 |
| 5,322,092 | 6/1994 | Howeth | 141/4 |

*Primary Examiner*—Renee S. Luebke
*Assistant Examiner*—Steven O. Douglas
*Attorney, Agent, or Firm*—Baker & Daniels

[57] ABSTRACT

A method and apparatus for drawing and measuring an amount of liquid agrichemical and dispensing the measured amount of agrichemical for mixture with water and eventual application onto a field. The agrichemical is drawn into a measuring vessel by suction pressure, created in one embodiment by an air compressor and valving system, and in another embodiment by a valve-pump in conjunction with a 3-way valve. The agrichemical is then dispensed from the measuring vessel either by positive pressure created by the same air compressor/valving system, or by suction pressure created by valve-pump/3-way valve. The valve-pump provides both a mixing chamber for the agrichemical and water prior to tank storage for eventual application, and controllable suction pressure for drawing the agrichemical out of the measuring vessel for mixing. The valve-pump is also self-cleaning thereby reducing the possibility of cross-contamination.

7 Claims, 15 Drawing Sheets

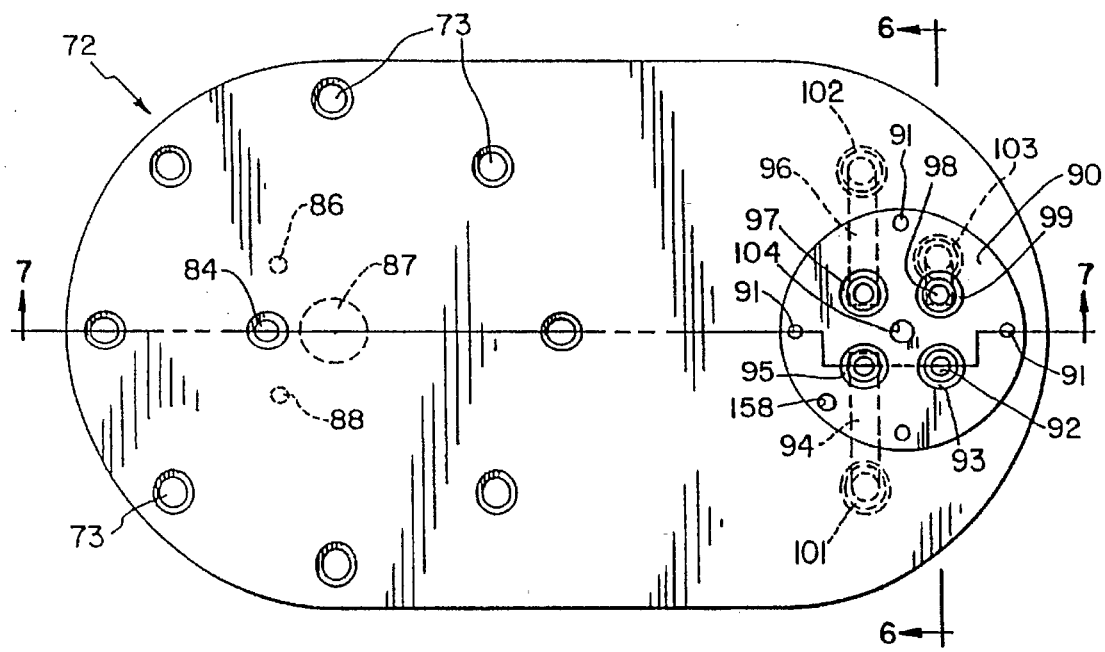
FIG. 5
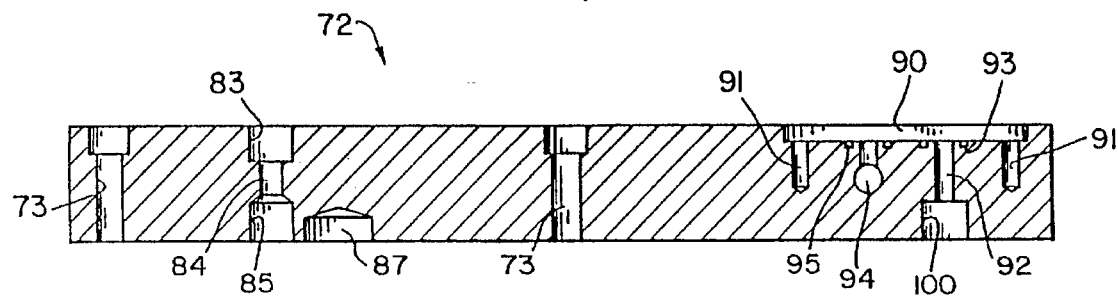
FIG. 7
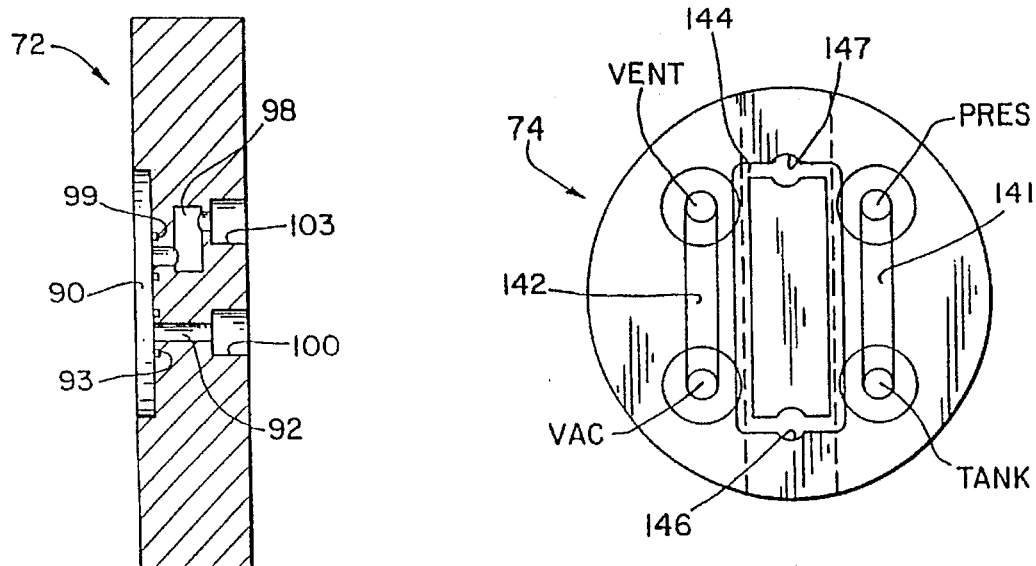
FIG. 6
FIG. 10

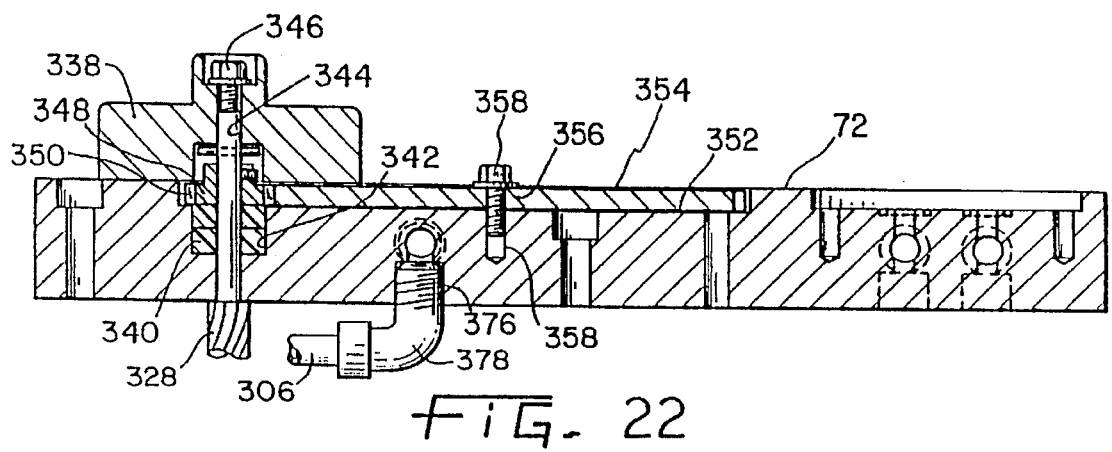
FIG. 22
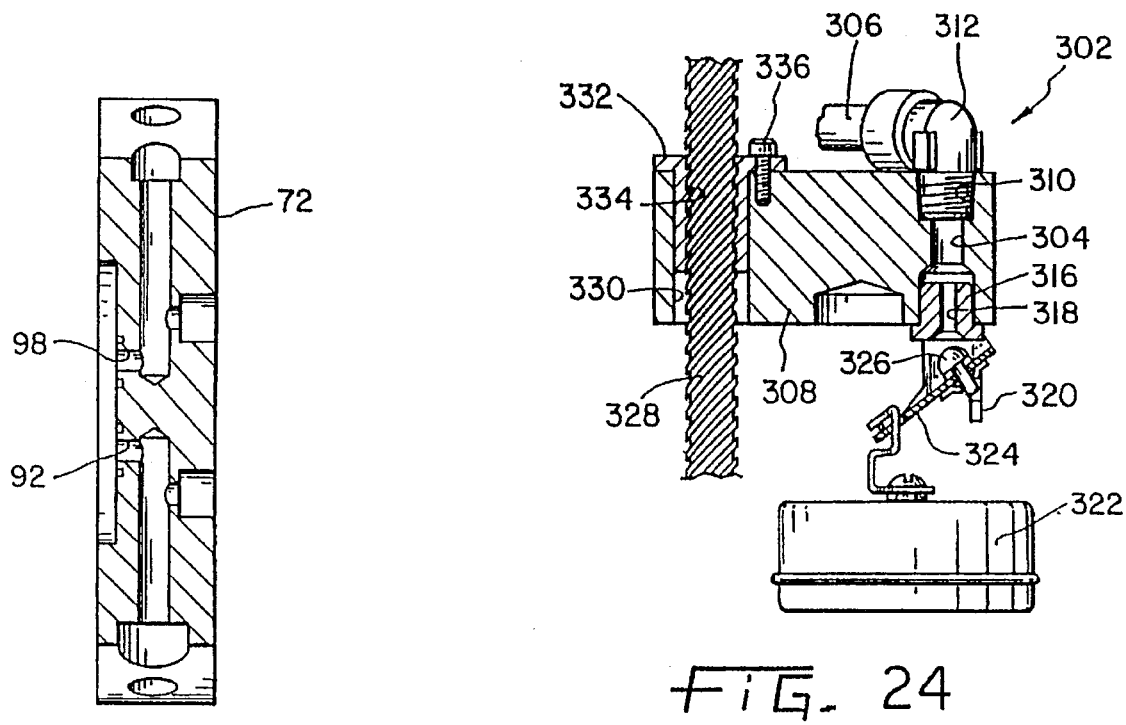
FIG. 23
FIG. 24

LIQUID CHEMICAL MEASURING AND DISTRIBUTION SYSTEM

This is a division of application Ser. No. 08/162,530, filed Dec. 3, 1993, now U.S. Pat. No. 5,450,881.

BACKGROUND OF THE INVENTION

The present invention relates to an apparatus and method for the measuring and dispensing of liquids and, more particularly, to an apparatus and method for the measuring and dispensing of liquid agrichemicals.

Liquid agrichemicals, such as herbicides, fertilizers, pesticides, fungicides, and the like, are advantageous over solid agrichemicals in many applications. For example, liquid agrichemicals provide faster response, especially in dry conditions, and for pesticides provide more effective control of soil insects.

Regarding certain agrichemicals, government regulations specify that such agrichemicals must be handled with a transfer system that substantially eliminates the possibility of spillage during the transfer of the agrichemical from the supply tank to the holding tank of a sprayer system.

Most modern agrichemicals are sold in a concentrated form which makes them unsuitable for direct application on the crop or field. Consequently, the concentrated agrichemical must be first diluted before application. In order to achieve a proper dilution ratio of the concentrated agrichemical to a diluent, the diluent being generally water, the concentrated agrichemical must be measured before mixing. Depending on various factors such as total end volume of mixture desired which, may be based on application or flow rate and the total acreage to be covered, as well as mixture strengths for various field conditions, etc. the proper mixture ratio is determined. The agrichemical must be accurately measured in order to achieve the proper mixture ratio in order for the agrichemical to properly perform.

Such concentrated agrichemicals generally pose a health hazard upon exposure, and thus, great care should be taken to avoid unnecessary contact therewith. The process of measuring and mixing the agrichemicals can pose a challenge to avoid unnecessary exposure.

Heretofore, various systems for measuring and diluting agrichemicals have generally included a conventional pump disposed in-line with the agrichemical for pumping the agrichemical to a mixing tank or otherwise. Usually a separate in-line pump is also used for pumping the water (diluent) into the mixing tank. Complicated valving is then utilized to control the flow. Unfortunately, such in-line agrichemical pumps tend to corrode very quickly due to the corrosive nature of agrichemicals.

U.S. Pat. No. 5,199,472 (Rollison) discloses a chemical transfer system which does not utilize an in-line pump for transferring the agrichemical from a storage tank to a mixing tank. A metering container assembly receives liquid agrichemical from a storage tank and transfers a desired amount of liquid agrichemical to a mixing tank or the like, without the use of an in-line pump. Referring to FIGS. 3 and 4, a single head air compressor as an inlet and an outlet which may be alternately disposed in fluid communication with the interior of the container or the ambient environment. Utilizing a first three-way valve connected to the inlet of the compressor, and a second three-way valve connected to the outlet of the compressor, the interior of the container may be connected to either the inlet or the outlet of the single head air compressor. When the inlet line of the single head air compressor is connected to the interior of the tank, a suction pressure is created within the interior of the tank which draws liquid agrichemical from a storage tank into the metering container assembly. Contrarily, when the outlet to the air compressor is connected to the interior of the metering container assembly, the liquid agrichemical is expelled from the metering container assembly to a mixing tank or the like. During a filling operation, a user visually observes the level of the liquid agrichemical within the metering container assembly and actuates the valve accordingly when the liquid agrichemical reaches a desired level. In the event a user inadvertently fails to actuate the valves and thereby cease application of suction pressure to the interior of the container, a float assembly disposed at the top of the interior of the container closes the line extending from the exterior of the tank to the inlet of the compressor. In the absence of such a float assembly, the liquid agrichemical would reach the top of the interior of the tank and may be drawn out through the tank line extending to the compressor because of the suction created within the tank line.

For proper operation of the metering container assembly, Rollison discloses a leveling device which is utilized for positioning the metering container assembly in a true vertical position. Such leveling is necessary to provide a proper visual indication to a user of the amount of fluid contained within the metering container assembly by viewing a sight gage, and also to ensure proper operation of an overflow valve. To effect leveling of the metering container assembly, a handle of a leveling means is rotated and a ball float of an indicator is aligned with cross hairs.

An object of the present invention is to provide an agrichemical measuring and mixing system which overcomes the problems of the prior art by having a closed measuring and diluting system.

It is another object of the present invention to eliminate the conventional in-line pump.

SUMMARY OF THE INVENTION

The present invention overcomes the shortcomings of the prior art by providing an agrichemical measuring and dispensing system utilizing air pressure differentials to draw the agrichemical into a measuring vessel and dispense the same for mixing with a suitable diluent.

In one form, the present invention provides a method of drawing a desired volume of liquid chemical from a chemical storage tank, measuring the desired volume, and dispensing the measured volume therefrom for mixing with a diluent. The method comprises the steps of providing a measuring vessel of a known volume, the measuring vessel having an inlet in fluid communication with the storage tank and an outlet. Creating a suction pressure within the measuring vessel to cause a desired volume of less than or equal to the predetermined volume of the measuring vessel of the chemical within the storage tank to be drawn therefrom and into the measuring vessel via the inlet. Then creating a high pressure within the measuring vessel to dispense the measured volume of chemical from the measuring vessel via the outlet.

Further, the present invention provides a method of drawing a desired measured volume of liquid chemical from a chemical storage tank and dispensing the measured volume therefrom for mixing with a diluent. The method comprises the steps of providing a measuring vessel of a known volume, the measuring vessel having an inlet in fluid communication with the storage tank, an outlet, and an air passage therein. A suction pressure is applied at the air passage for creating a suction pressure within the measuring vessel to cause a desired volume of less than or equal to the predetermined volume of the measuring vessel of the chemical within the storage tank to be drawn therefrom and into the measuring vessel via the inlet. Prevailing atmospheric pressure is applied at the air passage for creating an atmospheric pressure within the measuring vessel. Then a suction pressure is created at the outlet in order to draw the measured amount of liquid chemical accumulated within the measuring vessel therefrom for dispensing.

An apparatus for measuring a desired volume of concentrated liquid agrichemical stored in a bulk tank and dispensing the measured volume for mixing with a diluent is disclosed. The apparatus comprises a measuring vessel of a predetermined volume, the measuring vessel having a fluid inlet for fluid communication with the bulk tank, a fluid outlet for fluid communication with a dispensing device, and an air passage therein. Means for creating a suction pressure and a positive pressure is provided, as well as valve means in communication with, and between the suction and positive pressure creating means and the air passage for selectively applying one of a suction pressure and a positive pressure to the air passage, wherein when suction pressure is applied to the air passage the concentrated liquid agrichemical is drawn from the bulk tank and into the fluid inlet of the measuring vessel in order to fill the measuring vessel, and when positive pressure is applied to the air passage the concentrated liquid agrichemical within the measuring vessel is dispensed from the fluid outlet of the measuring vessel.

The present invention further provides an apparatus for drawing a desired measured volume of liquid chemical from a chemical storage tank and dispensing the measured volume for mixing with a diluent. The apparatus comprises a measuring vessel of a predetermined volume, the measuring vessel having a fluid inlet for fluid communication with the storage tank, a fluid outlet, and an air passage therein. A fluid actuated pump, which can be substituted for the compressor or work in conjunction with the compressor, is included having a suction inlet, a diluent inlet, and an outlet, for selectively creating a suction pressure at the suction inlet. When the fluid actuated pump is in a first position, diluent flows into the diluent inlet and out of the outlet without creating a suction pressure at the suction inlet because the nipple is in such a position that its configuration creates pressure rather than a vacuum. This pressure cleans the chamber behind the ball of contaminants, and a check valve is employed to prevent the pressurized water from entering the normal suction inlet of the pump. When the fluid actuated pump is in a second position, diluent flows into the diluent inlet and out of the outlet creating a suction pressure at the suction inlet. Further, the apparatus includes a valve selectively actuatable into a first position for applying the suction pressure created by the fluid actuated pump to the air passage whereby the suction pressure causes the liquid chemical to be drawn from the storage tank into the inlet and accumulate within the measuring vessel. The valve is selectively actuatable into a second position for applying the suction pressure created by the fluid actuated pump to the outlet of the measuring vessel whereby the suction pressure causes the liquid chemical within the measuring vessel to be dispensed therefrom. Thus, the liquid chemical is dispensed from the measuring vessel into the fluid actuated pump and is mixed with the diluent within the fluid actuated pump before flowing from the outlet of the fluid actuated pump.

Also, according to one aspect, the present invention provides a fluid actuated pump comprising a housing having a first inlet, a suction inlet, and an outlet. The pump further comprises a valve member disposed within the housing and selectively actuatable into a bypass position and a suction position. The valve member defines a chamber therein having a first opening of a first diameter, a second opening of a second diameter disposed diametrically opposite the first opening, a third opening of a third diameter disposed angularly between the first and second openings, and a fourth opening of a fourth diameter disposed diametrically opposite the third opening, the fourth diameter being smaller than the first and the second diameters. A tubular nipple is disposed over the fourth opening and extends into the chamber, with tubular nipple having a chamfer disposed on an end within the chamber, the chamfer facing the first opening when the valve member is in the bypass position. The valve member is manually moveable into the bypass position and the suction position, wherein when the valve member is in the bypass position the first and second openings align with the first inlet and the outlet respectively and the fourth opening is aligned with the suction inlet such that diluent flows from the first inlet and the first opening and through the second opening and the outlet without creating suction at the suction inlet. When the valve member is in the suction position, the fourth and third openings align with the first inlet and the outlet respectively, so that diluent flows through the nipple and the third opening, and the outlet and the second opening is aligned with the suction inlet thereby creating a suction pressure at the suction inlet.

The fluid actuated pump, because of its bypassing capabilities, allows the pump to be installed permanently in an existing line and simply bypassed when it is not being used, thereby causing little restriction for liquid transfer through the line.

An advantage of the present invention is that the liquid agrichemical may be transported from a storage tank to a measuring tank, without the use of an in-line pump, and without the use of complicated multiple valving.

Another advantage of the present invention is that the liquid agrichemical may be drawn into the measuring tank, and upon the liquid agrichemical reaching one of a plurality of predetermined levels within the measuring tank, the flow of liquid agrichemical from the storage tank is automatically stopped.

Yet another advantage is that the liquid agrichemical may be drawn into the measuring tank, and upon the liquid agrichemical reaching one of a plurality of predetermined levels within the measuring tank, the interior of the measuring tank may be automatically and very quickly vented to the atmosphere.

A still further advantage is that a fluid actuated pump may be utilized to create a suction pressure at the outlet of the measuring tank, and thereby evacuate the liquid agrichemical from the measuring tank.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5 is a top plan view of the distribution head of the measuring tank of FIG. 3;

FIG. 6 is a sectional view of the distribution head of FIG. 5 taken along line 6—6 thereof;

FIG. 7 is a sectional view of the distribution head of FIG. 5 taken along line 7—7 thereof;

FIG. 10 is a top sectional view of the air valve assembly of FIG. 8 in a tank dispensing position;

FIG. 22 is a sectional view of the distribution head of FIG. 21 taken along line 22—22 thereof;

FIG. 23 is a sectional view of the distribution head of FIG. 21 taken along line 23—23 thereof;

FIG. 24 is a sectional view of the float assembly shown in FIG. 20;

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
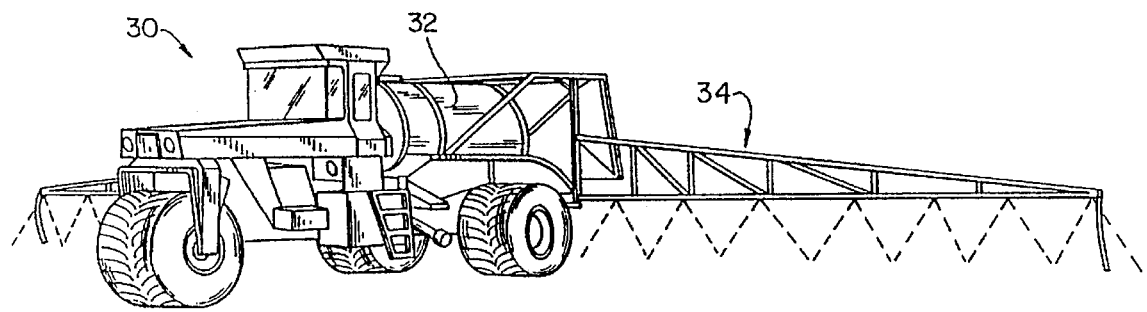
FIG. 1 is an elevational view of a tractor applying an agrichemical onto a field via a boom sprayer, the agrichemical being stored in a tank on the tractor.

FIG. 1 shows a tractor 30 such as, for example, a typical commercially available all-purpose farm tractor on which is installed a tank 32 of a certain volume carried at the rear thereof. Tractor 30 is equipped with a boom-type sprayer 34 such as is commonly used for applying various liquid agrichemicals onto crops or fields. Sprayer 34 is fluidly connected to tank 32 which holds the agrichemical for application.

Presently, most of the various types of agrichemicals that are used by the agricultural community, such as herbicides, pesticides, fungicides, and the like, are packaged for purchase in a concentrated form. This reduces the volume of liquid which must be transported to the field for application versus the traditional non-concentrated form. Also, because of the concentrated form, the tank containing the agrichemical may be smaller.

Figure 2:
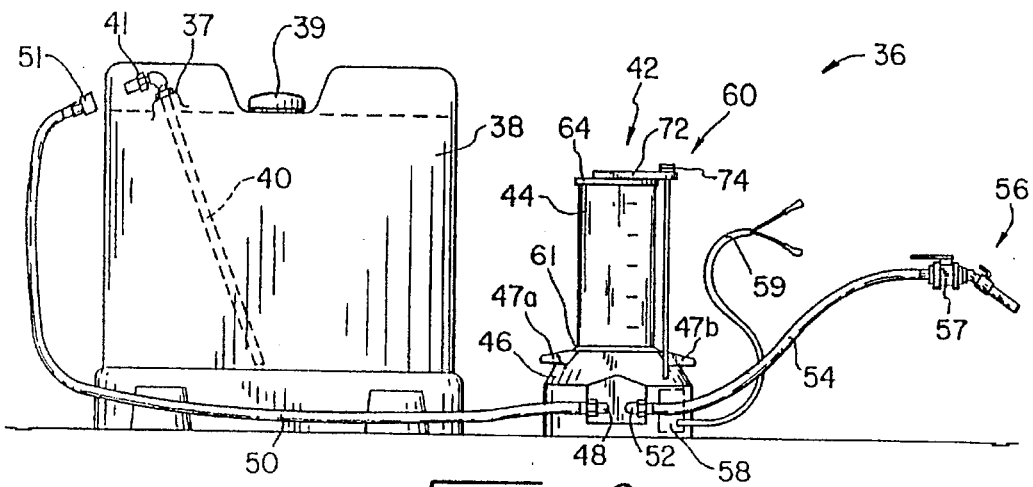
FIG. 2 is an elevational view of a chemical measuring and distribution system according to one embodiment of the present invention.

Referring now to FIG. 2 there is depicted an embodiment of the present chemical measuring and distribution apparatus 36. A bulk storage tank 38 contains the concentrated agrichemical of which a quantity needs to be measured and then diluted with a suitable volume of diluent prior to field application. The typical bulk storage tank 38 is generally fabricated from a suitable plastic material such that the tank may be returned for refilling or recycling. Bulk storage tank 38 includes a lid 39 sealing an opening through which the tank has been filled with the concentrated agrichemical. A conduit 40 is provided extending from the inner bottom of tank 38 to an opening 37 in the top, having a check valve therein and terminating with a fitting or dry break coupling 41. Conduit 40 thus provides fluid communication between the interior of tank 38 and the outside thereof for drawing the agrichemical out of the tank.

In accordance with one aspect of the present invention, apparatus 36 includes a measuring vessel assembly 42 having a cylindrical main body 44 seated upon a base cap 61 forming a measuring tank having a predetermined volumetric capacity 45. Base cap 61 is attached to base portion 46, having handles 47a, 47b integrally formed therein for transporting measuring vessel assembly 42. An inlet fitting 48 on base portion 46 is coupled to a hose 50 that terminates with a dry break coupling 51 with a backwash checkvalve to permit triple washing. Coupling 51 is adapted to connect to fitting 41 of tank conduit 40 such that the contents of bulk tank 38 is in fluid communication with measuring vessel assembly 42 via hose 50. Coupling 51 enables the measuring vessel 42 to be backwashed. An outlet fitting 52 on base portion 46 has a hose 54 connected thereto, with hose 54 terminating with a dispensing nozzle 56 having a valve 57 for controlling the outgoing flow of measured agrichemical. A compressor 58 is disposed within base portion 46 and provides air pressure, both positive and negative, as the prime mover for the measuring and dispensing of the agrichemical as hereinbelow described. Air compressor 58 includes leads 59 that are connected to a suitable source of electricity (not shown) for operating air compressor 58. Preferably air compressor 58 operates on 12 volts DC so that apparatus 36 may be portable and connected to the 12 volt DC power of a vehicle. As an example, air compressor 58 is a 12 volt DC, 1/10 HP diaphragm type, compressor capable of providing up to 15 psi and 15 inches of vacuum, such as a model 907 DC series air compressor manufactured by Thomas Industries, Inc. A valve assembly 74 is in communication with air compressor 58 and main body 44 providing regulatable control of the measuring and dispensing process as described hereinbelow.

Figure 3:
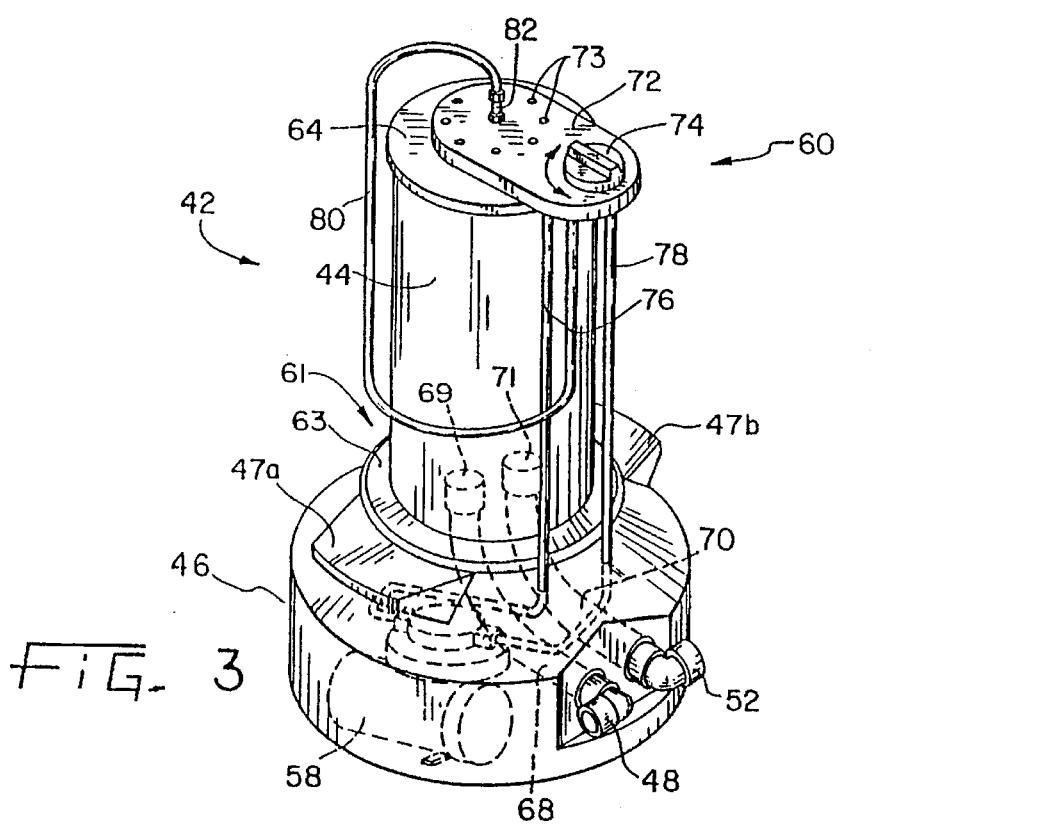
FIG. 3 is an elevational view of an embodiment of a measuring tank according to the present invention as utilized in the system of FIG. 2.
Figure 4:
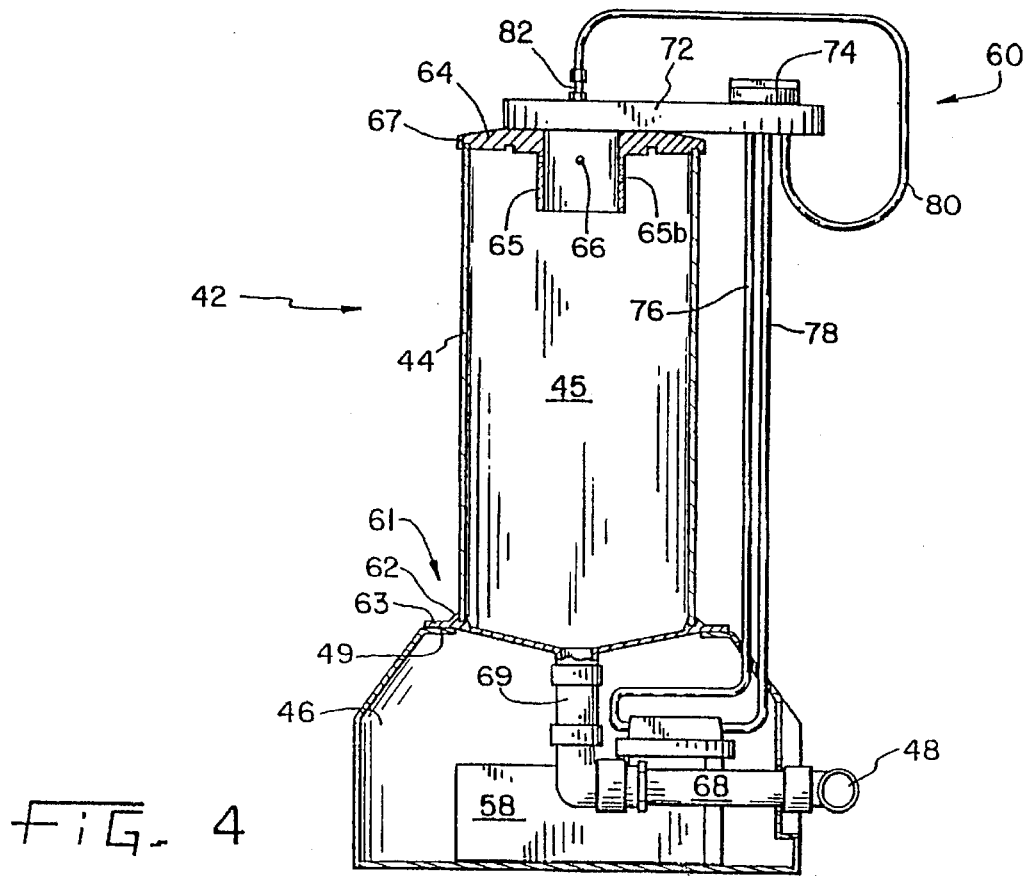
FIG. 4 is a sectional view of the measuring tank of FIG. 3.

Measuring vessel assembly 42 will now be described in greater detail with reference to FIGS. 3 and 4. Cylindrical main body 44 is fabricated out of a preferably opaque plastic such as, for example, a clarified polypropylene, and is formed with a 9" (inner diameter) by 0.25" wall. The cylindrical bottom edge of body 44 is seated within an annular groove 62 of a base cap 61 such that body 44 is retained thereby. Base cap 61 further includes an annular, radially outwardly extending ledge 63 that is in turn seated upon an annular, radially inwardly extending ledge 49 of base portion 46. Base cap 61 is fabricated out of a plastic such as, for example, a polypropylene. A top cap 64 has an annular groove 67 in which the cylindrical top edge of body 44 fits. Like base cap 61, top cap 64 is fabricated out of a plastic such as, for example, a polypropylene. Top cap 64 includes an axially downwardly projecting cylindrical portion 65, with a 1/8" hole 65B venting the interior and exterior of cylindrical portion 65, and encircling a float valve 66 such as, for example, a 316 stainless steel ball type float valve of the type commercially available from Armstrong. Float valve 66 provides port closing as hereinbelow described in order to prevent overfill of measuring vessel 42 during the measuring process. It can therefore be appreciated that body 44 with base cap 63 and top cap 64 defines a capacity 45 of a known volume, here being five (5) gallons, but any other predetermined volume will suffice. Furthermore, body 44 includes volume demarcations on the outside surface thereof in order to measure fractions of the known volume (see FIG. 2) for accurate dilution.

An inlet conduit 68 and outlet conduit 70 are each disposed within base portion 63 and are connected to respective inlet and outlet fittings 48, 52. At an end distal inlet and outlet fittings 48, 52, inlet and outlet conduits 68, 70 terminate in respective check valves 69, 71 of the spring-loaded type. Check valve 69 allows the agrichemical to flow into volume 45 via inlet conduit 68 but prevents agrichemical flow out of volume 45 via inlet conduit 68. Check valve 71 allows the flow of agrichemical from volume 45 via outlet conduit 70 but prevents an inward flow into volume 45 via outlet conduit 70. It should be appreciated that check valve 71 is selected such that the hydrostatic pressure exerted upon check valve 71 when volume 45 is completely filled, is not enough to overcome and unseat check valve 71, more pressure is required which is supplied by air compressor 58.

Valve assembly 60 is disposed on top cap 64 and includes a valve head 72. Valve head 72 is an elongated oval-shaped block of a suitable material, here plastic, and preferably a polypropylene of about one inch thick, which is secured at one end to the upper face of top cap 64 by a plurality of screws 73. Disposed at the other end of valve head 72 is a three-position air valve 74 that controls and allocates the air pressures or the air flow generated by air compressor 58. The positive pressure of 15 psi in the vacuum of 15 inches is accomplished by means of a small bypass valve located on the suction and pressure lines 76 and 78 of compressor 58. Valve head 72 is in communication with air compressor 58 via vacuum pressure line 76 and positive pressure line 78. A tank line 80 with quick disconnect 82, which is attached to valve head 72 such that tank line 80 may be in communication with volume 45 via float valve 66, is also connected to air valve 74. As described in detail hereinbelow, air valve 74 controls the filling and dispensing of vessel 42 by selectively permitting tank line 80 to be in communication with one of respective vacuum and positive pressure lines 76, 78, and vent.

Referring now to FIGS. 5-7, there is shown valve head 72. Valve head 72 includes a bore 84 for providing communication between volume 45 of vessel 42 and tank line 80. Bore 84 includes a larger diameter portion 83 extending downwardly a short distance from the upper surface of valve head 72 in which a corresponding quick disconnect fitting (not shown) is disposed as the mating portion for quick disconnect 82 of tank line 80. The quick disconnect 82 of tank line 80 permits tank line 80 to be used as an agitator line for a chemical tank the type which includes an air actuated internal agitator to mix the contents thereof. Bore 84 also includes a larger diameter portion 85 extending upwardly a short distance from the lower surface of valve head 72 in which float valve 66 is partially seated. Radially adjacent bore 84 are three valve head alignment recesses 86, 87, 88, that fit into corresponding projections (not shown) on the top surface of top cap 64. This recess (86–88) and projection combination provides seating and alignment of valve head 72 on top cap 64.

The end of valve head 72 opposite bore 84 includes an annular recess 90 that is adapted to receive and retain air valve 74. Four screw bores 91 are equalannularly spaced within recess 90 relative to each other and are disposed towards the outer annular edge thereof. Four bores 92, 94, 96, 98, are likewise equalannularly spaced within recess 90 relative to each other and are disposed towards the center thereof. Bores 92, 94, 96, 98 provide communication between valve head and corresponding bores 118, 119, 120, 121 of valve body 108 (see FIG. 9) as described hereinbelow. Radially surrounding each bore 92, 94, 96, 98, on the upper surface of valve head 72 is an annular recess 93, 95, 97, 99, respectively, in which are disposed suitable UHMW valve seats (not shown). The UHMW valve seats are epoxy glued into place to help minimize air leakage between valve head 72 and air valve 74 during operation. Bore 92 is a straight-through bore with a larger diameter lower opening 100 at the lower surface of valve head 72, while each other bore 94, 96, 98, has a larger diameter lower opening 101, 102, 103, respectively, at the lower surface of valve head 72, which are offset from the upper surface opening. Each larger diameter portion 100, 101, 102, 103 is adapted to receive an air line fitting such that one of the various air lines 76, 78, 80, or vent may be attached thereto. It should be appreciated that each lower opening does not have to be offset from the upper opening of the respective bore, but doing so reduces crowding and interference between the various air line connections when the lines are installed or removed. Centrally disposed in recess 90 is a bore 104 through which is received valve stem 106 (see FIG. 8) of valve head 74. Thus, valve head 72 defines a seat for air valve 74 as well as providing an attachment seat for air lines 76, 78, 80, and communication therebetween.

Figure 8:
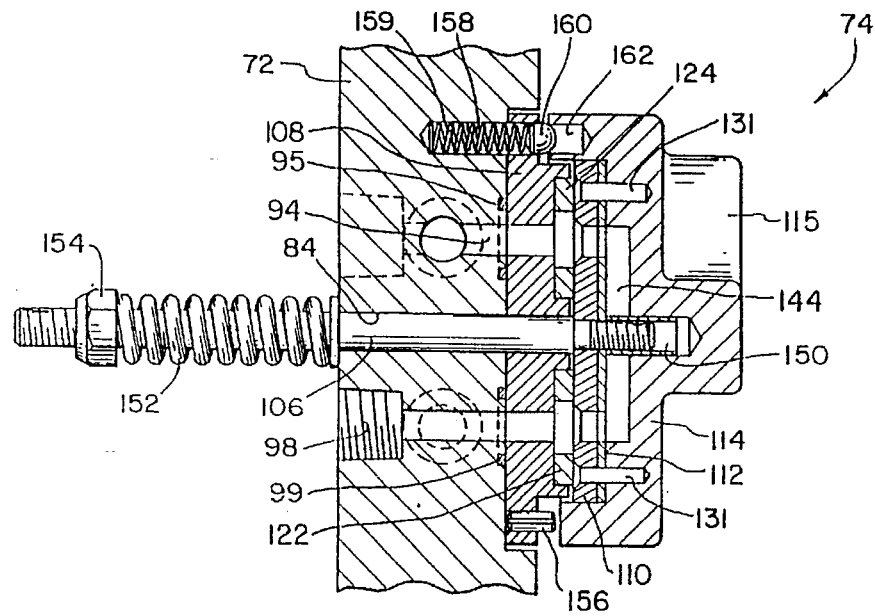
FIG. 8 is a sectional view of the distribution head and air valve assembly of the measuring tank of FIG. 3.
Figure 9:
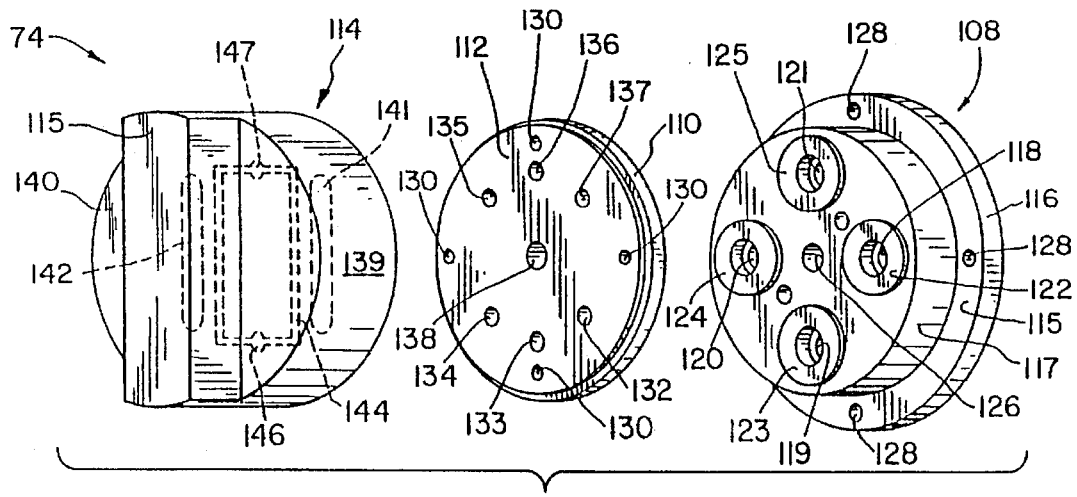
FIG. 9 is an exploded view of the air valve assembly of FIG. 8 showing the various parts thereof.

FIG. 9 depicts an exploded view of air valve 74 showing its various components and features thereof. Air valve 74 includes an annular valve body 108, an annular valve plate 110, an annular gasket 112, and an annular valve manifold 114 that includes a handle portion 115. Valve body 108 is fabricated from a suitable material, such as, for example, UHMW polypropylene and includes a first annular plate-like portion 116 having a given diameter and thickness and an integral second annular plate-like portion 117 having a given diameter and thickness disposed concentric to first annular portion 116. The diameter of second annular plate-like portion 117 is less than the diameter of first annular plate-like portion 116 such that an annular ledge 115 is defined, while the thickness of second annular plate-like portion 117 is greater than the thickness of first annular plate-like portion 116. Valve body 108 includes four bores 120, 121, 122, 123, which extend through first and second plates 116, 117. The placement of bores 120, 121, 122, 123, in valve body 108 corresponds to the placement of bores 92, 94, 96, 98 such that when valve body 108 is fixedly seated in recess 90 of valve head 72, bores 118, 119, 120, 121, align with bores 92, 94, 96, 98. Ring-like valve seats 124, 125, 126, 127, preferably of a UHMW polypropylene material, are disposed in each bore 120, 121, 122, 123 respectively and are epoxy glued into place. Located at the center of valve body 108 is a bore 126 extending through first and second annular plate-like portions 116, 117, which bore 126 is adapted to receive an end of valve stem 106 (see FIG. 8). Disposed in first annular plate-like portion 116 towards the outer annular edge thereof, are screw bores 128 which align with screw bores 91 of recess 90 of valve head 72 for securing valve body 108 in recess 90 and thus onto valve head 72.

Gasket 112 is overlaid onto one side of valve plate 110 facing valve manifold 114. Both gasket 112 and valve plate 110 have corresponding screw bores 130 that spatially coincide with like bores (not shown) in valve manifold 114. Screws 131 (see FIG. 8) secure valve plate 110 and gasket 112 to manifold 114 such that both are fixed to manifold 114 and non-rotatable relative thereto. Extending through gasket 112 and valve plate 110 are six bores 132, 133, 134, 135, 136, 137. Manifold 114 is fabricated from a suitable metal, such as, for example, UHMW polypropylene, and includes a cylindrical portion 139 with a flat top 140 and integral handle 115. Cylindrical portion 139 is axially elongated and has an inner diameter of sufficient size so as to fixedly receive valve plate 110 and gasket 112 therein and to extend over second annular portion 117 of valve body 108 and be limitedly rotatable thereon. Disposed on the inner surface of manifold 114 are two elongated oval-shaped channels 141, 142 oriented essentially parallel relative each other. Between channels 141, 142 is a rectangular channel 144 having its longer sides oriented essentially parallel to channels 141, 142. Located in each short side of channel 144 midway along the length thereof, is an annular recess 146, 147. Disposed in the center of valve plate 110 and gasket 112 is a bore 138 through which is received valve stem 106 (see FIG. 8)..

When gasket 112 and valve plate 110 are fixed to manifold 114, bores 133 and 136 are aligned with annular recesses 146 and 147 respectively. This allows bore 133 to be in communication with bore 136 via rectangular channel 144. Channel 144 is designed to enable the measuring tank to vent more quickly so that when controlling the intake or discharge of product, the flow of product can be stopped immediately when the valve is turned to the off position upon achieving the desired level. Bore 132 is aligned with one end of channel 141, while bore 137 is aligned with the other end of channel 141, such that bores 132 and 137 are in communication with each other via channel 141. In like manner, bore 134 is aligned with one end of channel 142, while bore 135 is aligned with the other end of channel 142, such that bores 134 and 135 are in communication with each other via channel 142.

Bores 132–137 are spatially oriented relative bores 118–121 of valve body 108 such that rotation of manifold 114 and fixed valve plate 110 through a 90° rotational parameter relative valve body 108 permits selective communication between bores 132–137 of valve plate 110 and air bores 118–121 of valve body 108. Bores 133 and 136 permit communication between diametrically opposed bores in valve body 108, while bore pairs 132, 137, and 134, 135 permit communication between annularly neighboring bores in valve body 108 depending on the rotational orientation of manifold 114 and valve plate 110 relative to valve body 108.

Referring specifically now to FIG. 8, there is shown assembled air valve 74 secured to valve head 72. Valve plate 110 with valve gasket 112 are secured to valve manifold 114 by screws 131 while valve body 108 is secured to valve head 72. In order for valve manifold 114 with valve plate 110 and valve gasket 112 to limitedly rotate on valve body 108, a valve stem 106 is provided which extends through bore 84 in valve head 72 and is threadedly received in a threaded valve stem bore 150 in valve manifold 114. A compression spring 152 is disposed on valve stem 106 and secured thereto by a locknut 154. Valve body 108 further includes an expansion pin 156, and bore 158 in which is received a compression spring 159 exerting a force against a ball bearing 160 in a position detente 162 in valve manifold 114. These features maintain valve manifold 114, valve plate 110, and valve gasket 112 held against valve body 108 while allowing for rotation of manifold 114 and plate 110 through a limited range of movement of 90° relative valve body 108 in order for passages 141, 142, 144 to align with selective bores 118–121 of valve body 108.

The operation of the embodiment of the present invention as depicted in FIGS. 2–12 will now be described. An amount or volume of concentrated agrichemical which is stored in bulk tank 38 must be measured before dilution with the diluent in order to achieve a desired mixture ratio. Hose 50 is connected at one end to bulk tank 38 via fittings 51, 41 and at the other end to inlet fitting 48. Air compressor electrical lead 59 is connected to a suitable source of electrical energy, here being 12 V DC such that the electrical system of the tractor or vehicle is used, allowing apparatus 36 to be portable. According to the present invention, the agrichemical is thus drawn from the bulk tank into the measuring vessel by creating a suction pressure within capacity 45 of measuring vessel 42 which is in communication with bulk tank 38. This is accomplished by air compressor 58 in conjunction with air valve 74 and lines 76, 78, 80 and vent, providing selective communication between the various lines and vent.

Figure 11:
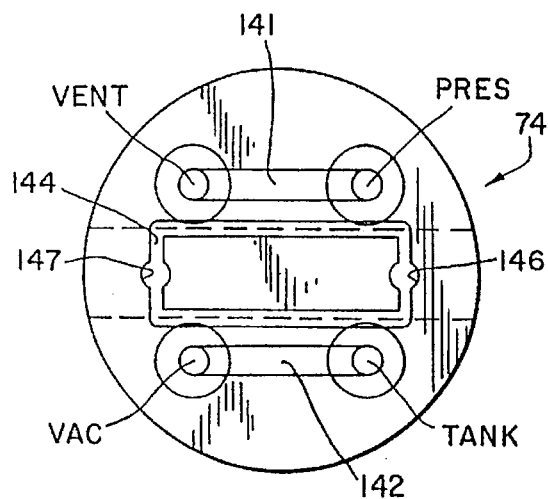
FIG. 11 is a top sectional view of the air valve assembly of FIG. 8 in a tank fill position.
Figure 12:
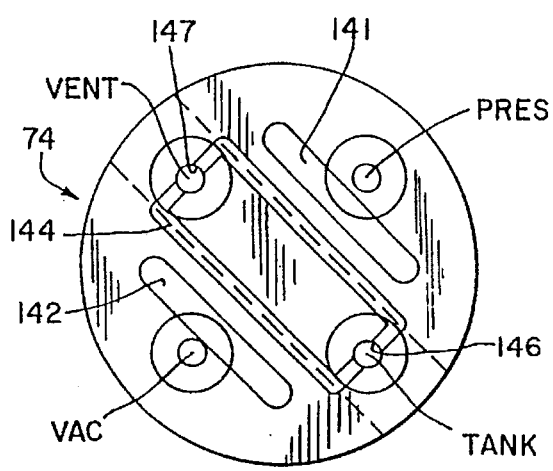
FIG. 12 is a top sectional view of the air valve assembly of FIG. 8 in a neutral, or tank to vent, position.

The agrichemical thus enters volume 45 via inlet conduit 68 and through check valve 69 when vacuum line 76 is in communication with tank line 80 which is the case when air valve 74 is in a Tank Fill position, or TANK to VAC position, as depicted in FIG. 11. Initially, air valve 74 should be in a Neutral position, or TANK to VENT position, as depicted in FIG. 12. It should be appreciated that for clarity, bores 118–121 (FIG. 9) are labelled VAC, PRES, TANK, and VENT, respectively indicating line attachment to vacuum line 76, pressure line 78, tank line 80, and vent to the prevailing atmosphere. In this manner, the three positions of valve 74 are more easily understood when describing the operation thereof. It should also be understood that the orientation of VAC, PRES, TANK, and VENT relative to each other must be as set forth in FIGS. 10–12 for the channels to correctly align with the proper bores.

When air valve 74 is in the Neutral or TANK to VENT position as depicted in FIG. 12, tank line 80 (denoted TANK) is in communication with channel 144 via recess 146 and thus the vent to atmosphere, denoted VENT, is in communication with channel 144 via recess 147 such that volume 45 is in communication with the prevailing atmosphere. Thus, there is no suction or vacuum pressure exerted on volume 45 nor is there a positive pressure exerted on volume 45. In this position, no fluid can flow into measuring vessel 42 or, alternatively, if there was fluid within measuring vessel 42, no fluid would flow therefrom. This is due to the fact that suction line 76, denoted VAC, may be in communication with channel 142 but not in communication with any other bore, while pressure line 78, denoted PRES, may be in communication with channel 141 but not in communication with any other bore. It should also be appreciated that the Neutral position (FIG. 12) is essentially the "off" position, and valve 74 thus rotates only 45° in both the clockwise and counterclockwise directions therefrom in order to obtain a Tank Fill position (FIG. 11), and a Tank Dispense position (FIG. 10). Furthermore, valve 74 is designed such that it must pass through the Neutral position when switching between the Tank Fill position and the Tank Dispense position, and vice versa.

As the operator wishes to fill measuring tank 42, air valve manifold 114 of air valve 74 is rotated into the Tank Fill position as depicted in FIG. 11. When air valve 74 is in the Tank Fill position as depicted in FIG. 11, PRES is in communication with VENT via channel 141 such that the pressure side of compressor is vented to the prevailing atmosphere, while TANK is in communication with VAC via channel 142 such that compressor 58 is exerting a suction pressure via tank line 80 within volume 45. It should be noted that channel 144 is not in communication with any bore when valve 74 is in the Tank Fill position. The suction pressure created within volume 45 causes inlet check valve 69 to open thereby causing the liquid agrichemical to flow from tank 38 through hose 50 and into inlet conduit 68 to fill volume 45. As mentioned hereinabove, check valve 71 of outlet conduit 70 permits outflow of agrichemical that has entered volume 45, however check valve 71 requires more than normal head pressure developed by even a completely filled measuring tank to open.

When the desired amount of agrichemical has entered volume 45, the operator may either immediately dispense the volume of agrichemical accumulated within capacity 45 or retain the volume of agrichemical for later dispensing. In order to retain the volume of agrichemical within volume 45, manifold 114 of air valve 74 is turned to the Neutral position (FIG. 12) such that TANK is in communication with VENT via channel 144. This allows the suction or low pressure developed within volume 45 to be vented to atmospheric pressure such that an equilibrium condition exists between volume 45 and the prevailing atmosphere. In this condition, the agrichemical within volume 45 may be maintained until it is time to dispense the agrichemical as inlet check valve 69 does not cause backflow and outlet check valve 71 is such that additional pressure is required to be open.

When the operator desires to later dispense the measured amount of agrichemical within volume 45 or decides to immediately dispense the agrichemical, manifold 114 of air valve 74 is rotated to a Tank Dispense position as depicted in FIG. 10. In this position, VAC is in communication with VENT via channel 142 such that air compressor 54 is sucking atmosphere pressure via VENT. TANK is in communication with PRES via channel 141 such that positive pressure is thus in communication with volume 45 via air line 80. As mentioned hereinabove, immediate dispensing by rotating valve 74 into the Tank Dispense position from the Tank Fill position causes valve 74 to pass through the Neutral position such that volume 45 will be vented to atmosphere. This pressure created within volume 45 is enough to unseat outlet check valve 71 and thus the liquid agrichemical is caused to flow through outlet conduit 70 through outlet hose 54 and directed by dispensing nozzle 56. It should be here noted that should the operator during the Tank Fill process forget to return air valve 74 to the neutral position or to the Tank Dispensing position before the liquid agrichemical completely fills volume 45, float valve 66 will be actuated to unseat and seat against tank line bore 84 to prevent further suction pressure to draw more agrichemical into measuring tank 42. Since air compressor 58 is also safety vented, i.e. it will vent upon reaching a certain amount of pressure or vent when suction pressure is disabled, measuring tank 42 cannot be overfilled. Even though air compressor 58 will continue to run until either disconnected from the electrical power supply or air valve 74 is turned to the neutral or tank dispense position, only a predetermined maximum volume of agrichemical may enter measuring tank 42.

Figure 13:
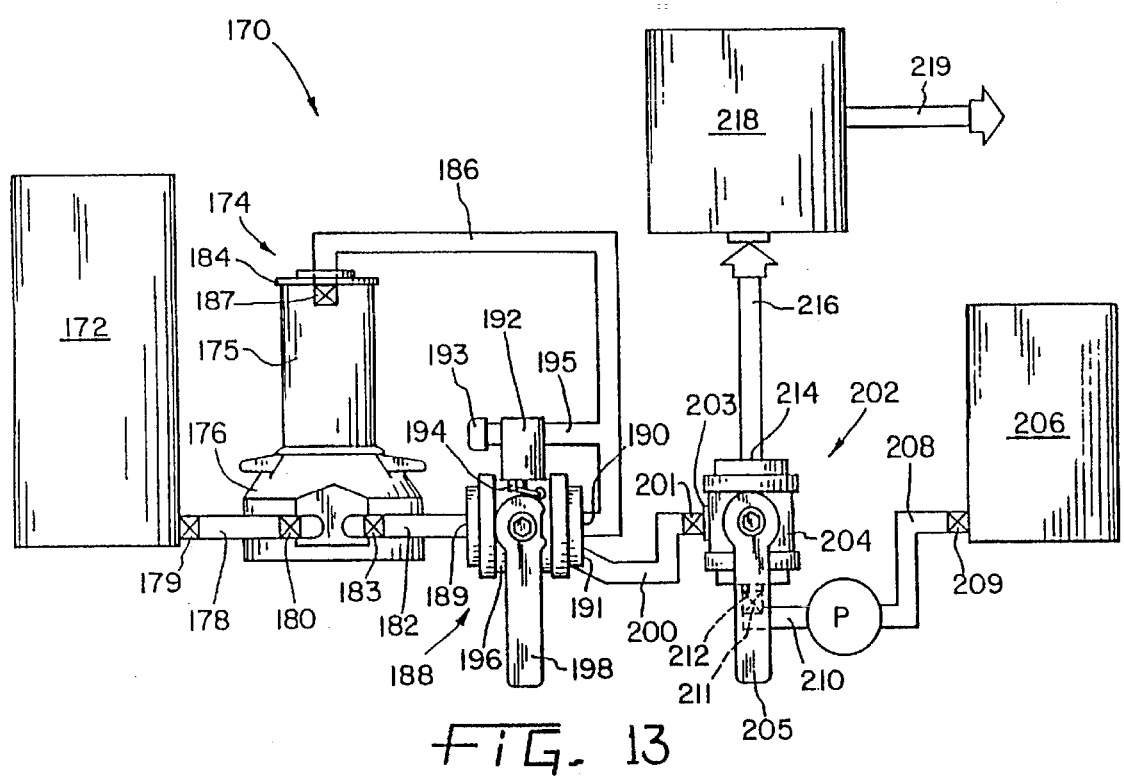
FIG. 13 is an elevational view of a chemical measuring and distribution system according to another embodiment of the present invention.

Referring now to FIG. 13 there is shown another embodiment of the present chemical measuring and distribution apparatus 170. Apparatus 170 includes a tank 172 that contains the concentrated liquid agrichemical. A measuring vessel 174 is provided having a tank portion 175 enclosing a known predetermined volume disposed on a base portion 176. Tank 175 and base 176 is of a similar makeup and construction as measuring vessel 42 described hereinabove. Storage tank 172 is in fluid communication with measuring vessel 174 via intake conduit 178. Disposed in conduit 178 at the outlet of storage tank 172 is a check valve 179 permitting flow out of storage tank 172 but not back therein. Furthermore, disposed in intake conduit 178 is a check valve 180 of similar construction, function, and purpose as that of check valve 69 of measuring vessel 42. Extending from measuring vessel 174 is an outlet conduit 182 having a check valve 183 disposed therein of similar construction, function, and purpose to check valve 71 of measuring vessel 42, such that check valve 183 permits fluid to flow from tank 175, but will prevent backflow therein. An air conduit 186 is in communication with the top of tank 175 with a float valve 187 disposed therebetween. As described in more detail hereinbelow, suction pressure developed in conduit 186 creates suction pressure within tank 175 to draw the liquid agrichemical from tank 172 therein via conduit 178, while when suction pressure is applied to conduit 182, the measured liquid agrichemical is drawn from measuring vessel 174 for dispensing thereof.

A three-way valve 188 with vent 192 is provided for regulatably controlling to which one of conduits 182 and 186 is a suction pressure applied, if any, as will be more apparent in the following description. Outlet conduit 182 is connected to three-way valve 188 at inlet side 189, while air conduit 186 is in communication with three-way valve 188 at inlet 190. Air conduit 186 is also in communication with vent 192 via vent conduit 195. Vent 192 includes a breather/filter 193 in communication therewith. As will be further apparent with the following description of the operation of three-way valve 188, vent 192 is in selective communication with air conduit 186 such that air conduit 186 is in communication with the prevailing atmospheric pressure and thus tank 175 is vented to the prevailing atmospheric pressure. Three-way valve 188 includes an outlet port to which is connected to an outlet conduit 200. Outlet conduit 200 is in communication with pump/valve 202 at inlet side 203. Disposed at inlet side 203 within conduit 200 is a check valve 201 which allows flow from three-way valve 188 into pump/valve 202 but which prevents backflow from pump/valve 202 and into three-way valve 188. Three-way valve 188 further includes a handle 198 for providing manual, selective communication between the selective conduits 182, 186, and 200 as described hereinbelow.

Pump/valve 202 includes a main body 204 and a manually operated handle 205 to position the valve to either pass liquid therethrough without creating suction pressure in conduit 200, to cause suction pressure in conduit 200 as described hereinbelow. Tank 206, containing a suitable diluent, preferably water, is in fluid communication with pump/valve 202 via conduit 208, pump P, and conduit 210. Disposed in conduit 208 is a check valve 209 allowing the water within tank 206 to flow therefrom but preventing backflow therein. Pump P, which can be any type of in-line type pump is disposed between conduits 208 and 210 for pumping water from tank 206 through conduit 208 and 210 into inlet 212 in main body 204. Disposed in conduit 210 is a check valve 211 allowing the water to flow into pump/valve 202 but which prevents backflow into pump P. Thus, in this manner pump P will always pump non-corrosive diluent therethrough and into pump/valve 202. Main body 204 also includes an outlet 214 to which is connected conduit 216 providing fluid communication between pump/valve 202 and a holding or mixing tank 218. A distribution conduit 219 is connected to mixing tank 218 which can then go to the spray heads of the agricultural sprayer.

Pump/valve 202 operates to either allow the diluent to flow directly therethrough and into tank 218 without creating a suction pressure within conduit 200 or pump/valve 202 may be positioned such that the diluent flows therethrough while creating a suction pressure in conduit 200. It should be here noted that when pump/valve 202 is in a position such that no suction pressure is created in conduit 200 (a By-pass position) and the water is directly flowing therethrough from tank 206 to tank 218, dispensing tank 174 can neither be filled nor dispensed regardless of the position of three-way valve 188. However, when pump/valve 202 is in a Suction position, the water flowing through main body 204 creates a suction pressure within conduit 200 which, depending on the position of three-way valve 188 can alternatively fill or dispense the contents from measuring vessel 174. Three-way valve 188 can also be in a Neutral position.

Figure 17:
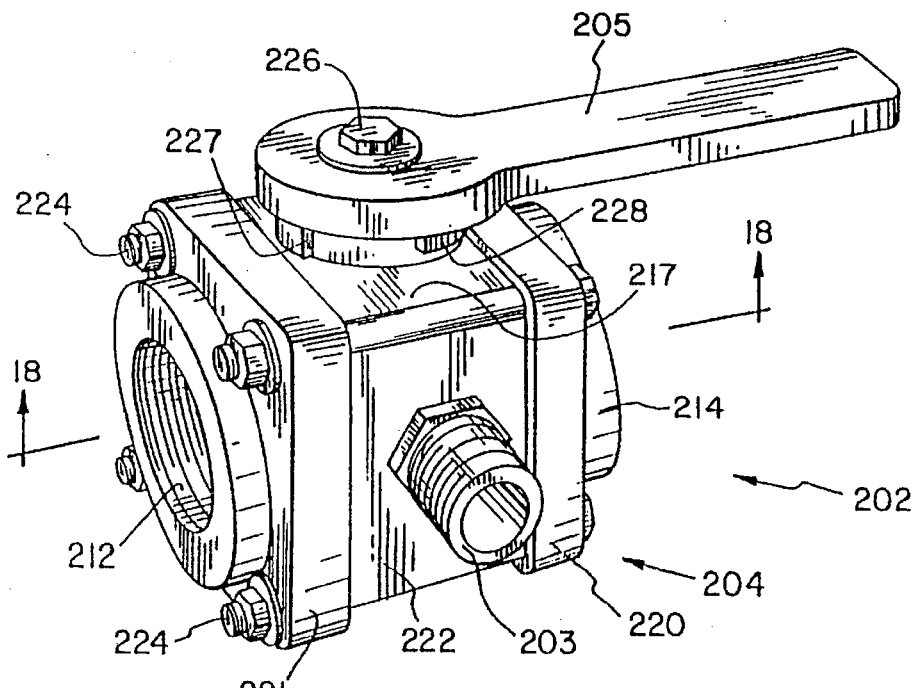
FIG. 17 is an elevational view of a pump/valve according to an aspect of the present invention as utilized in the system of FIG. 13.
Figure 18:
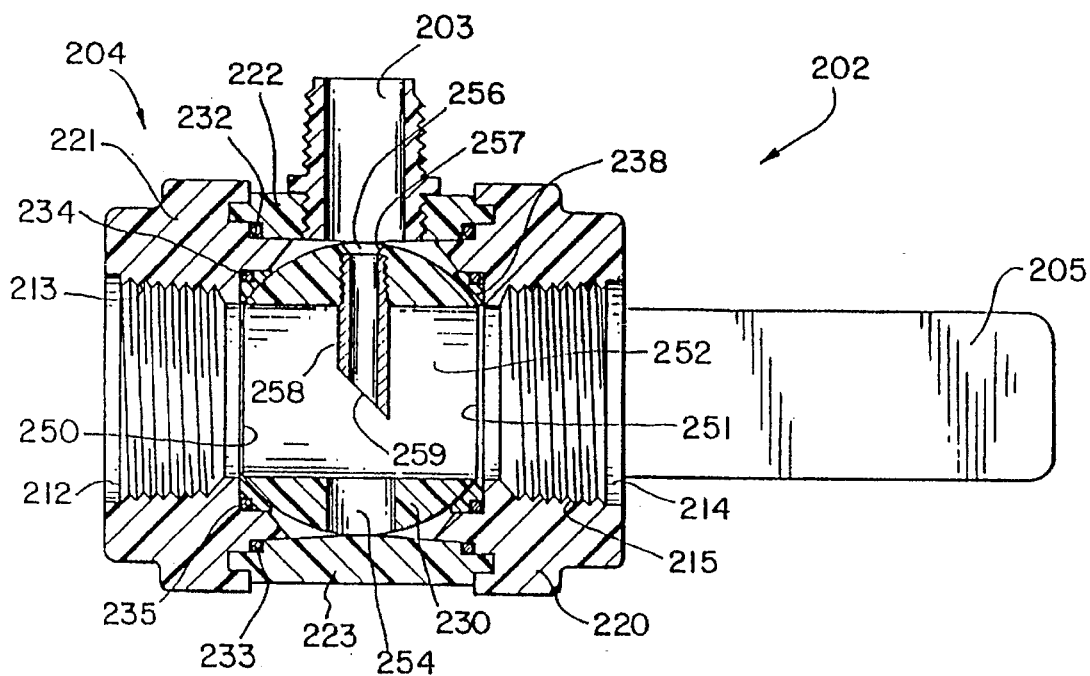
FIG. 18 is a sectional view of the pump/valve of FIG. 17 in a flow-through position.
Figure 19:
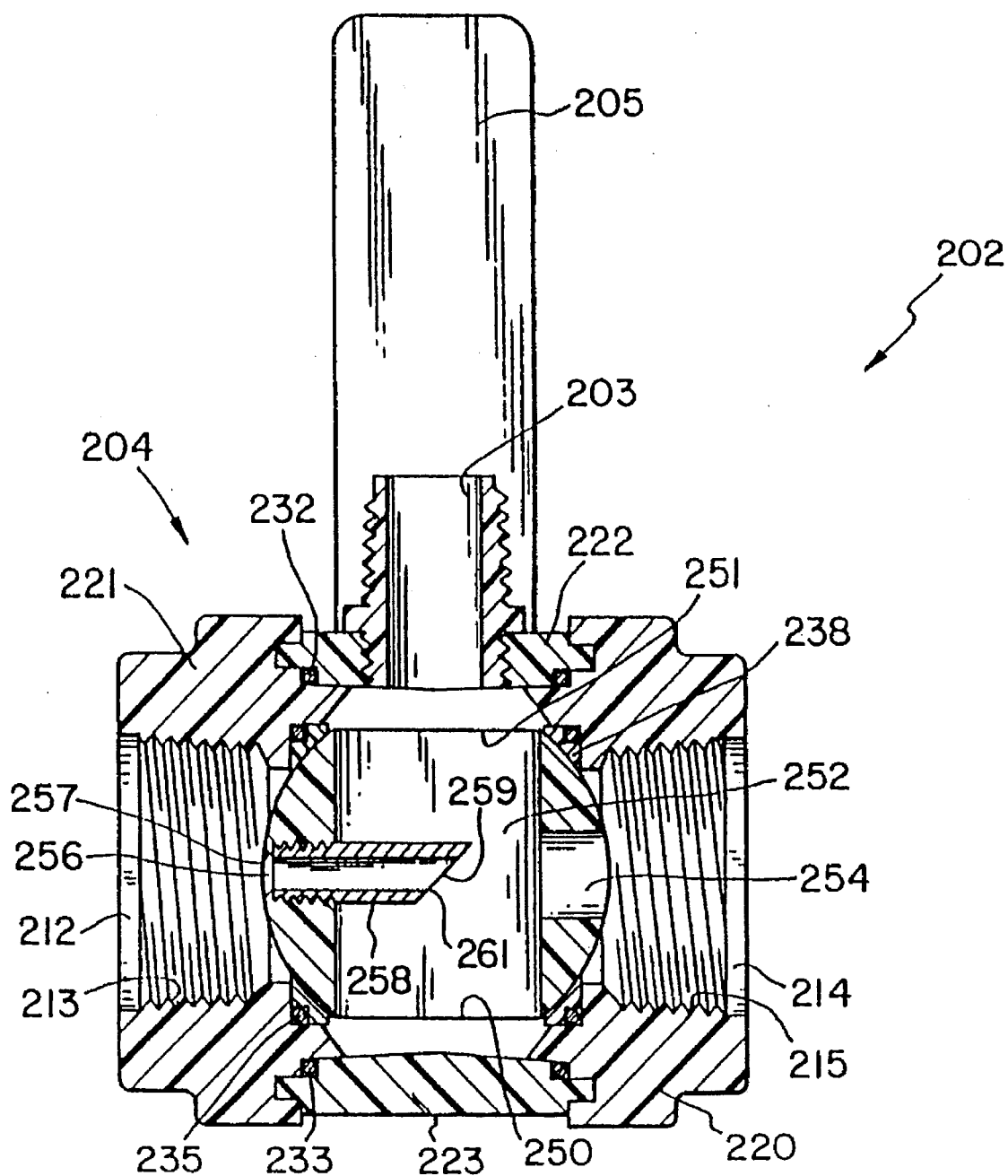
FIG. 19 is a sectional view of the pump/valve of FIG. 17 in a pumping/mixing position.

Referring now to FIGS. 17–19, the structure and operation of pump/valve 202 will now be described. Referring in particular to FIG. 17 there is a shown a perspective view of the present pump/valve 202. Pump/valve 202 includes a main body 204 preferably made of a polypropylene material. Main body 204 includes two end portions 220 and 221 with four side portions of which three side portions 217, 222, 223 are shown therebetween held together by suitable bolts 224 extending therethrough. Pivotally disposed on body 204 is a handle 205 having a pivot bolt 226. Pivot bolt 226 is attached to an internal ball 230 such that as handle 205 limitedly pivots, ball 230 (see FIGS. 18, 19) pivots therewith. A stop 227 is formed on the housing which engages a stop 228 formed on handle 205 such that handle 205 only rotates through a 90° range of movement which defines two positions.

Referring now to FIGS. 18 and 19, pump/valve 202 is depicted in the By-pass/No Suction creating position (FIG. 18) and a suction creating position (FIG. 19). As can be seen in FIG. 18, inlet 212 includes internal threads 213 for receiving like threads of conduit 210 while outlet opening 214 includes internal threads 215 for receiving like threads of conduit 216. Disposed between side portion 222 and end portions 221 and 220 is an O-ring 232 for sealing therebetween while and O-ring 233 is disposed between side portion 223 and end portions 220 and 221. Orifice 203 is threadedly connected to side 222 and is in communication with ball 230.

A chamber 238 is formed within main body 204 in which a polypropylene ball 230 is rotatably disposed. As handle 205 rotates ball 230 is caused to rotate therewith through a limited 90° range of movement about a vertical axis through pivot bolt 264. For adequate sealing, O-rings 234, 235 are disposed in chamber 238. Ball 230 has a cylindrical chamber 252 having diametrically opposed openings 250, 251 corresponding in size to respective inlets 212 and 214. Thus, in this manner any product entering the opening 212 will flow through chamber 252 and out opening 214. Disposed on one side of ball 230 90° on either side from openings 250 and 251 is a smaller outlet port 254. Diametrically disposed from outlet port 254 in ball 230 90° on either side from ports 250, 251 is an inlet port 256 having an inward chamfer 257 of approximately 45°. Disposed in ball 230 and in communication with inlet 256 is a hollow stainless steel nipple 258 which extends into area 252. Nipple 258 has a 30° bevel or chamfer 259 which, in the By-pass position faces inlet 212. The term "chamfer" used herein means any shape that produces a deflecting surface extending axially beyond the shortest dimension of the distal end 261 of nipple 258, e.g. an "L" shape.

FIG. 18 depicts pump valve 202 and the By-pass position in which as fluid flows into opening 212 and 250 and exits outlet 251 and 214, the fluid impinges on chamfer 259 and therefore no suction pressure is created within nipple 258 or thus inlet 203. However, it should be noted that due to the configuration of the valve design, the facing of the bend of nipple 258, and the positioning of orifice 254, pump/valve 202 when in the By-pass position is continually cleaning cavity 238. This type of high velocity cleaning keeps cross contamination of chemicals to a minimum.

However, when pump/valve 202 is moved into the Suction position as depicted in FIG. 19, a suction pressure is created at inlet 203 and subsequently in conduit 200. This can also be considered a Pumping position in that any fluid source connected to inlet 203 is caused to be pumped into chamber 252 and mixed with any fluid entering inlet 212. When pump/valve 202 is in the Suction or Pumping position, the use of different nipple 258 sizes in relation to outlet port 254, almost any ratio of media to chemical gallons/minute can be obtained. While using the same method, higher vacuum limits can also be obtained at inlet 203 in excess of 29 inches of vacuum. The vacuum created at inlet 203 the greater the head pressure that can be overcome. However, while the suction or vacuum increases, the flow rates will decrease. Thus, proper sizing is essential for each application. As an example, a 9/16 inch outlet with a media water pressure of 40 psi, head of 2 psi, a media flow rate of 15 GPM, and chemical flow rate of 12 GPM, produces a 27 inch vacuum at inlet 203. This suction is created by a venturi-like principle in that the rotation of ball 230 causes opening 256 and thus nipple 258 to be in communication with inlet 212. The restricted flow into chamber 252 effected by nipple 258 and out through port 254 creates the suction pressure at 203 as opening 251 is now in communication therewith. Thus, as fluid is pumped by pump P into pump/valve 202 via inlet 212, while pump/valve 202 is in the pumping/suction position, a suction pressure is created such that an incoming flow from inlet 203 may mix with incoming fluid from inlet 212 to exit outlet 214.

It can thus be appreciated that valve/pump 202 can be used for proportioning, mixing, aeration, dispensing, a vacuum pump with up to 29.2 inches of vacuum, and product sampling either by itself or with two or three valves installed in series so that multiple GPM's or vacuum needs are available when different flow rates are needed or when different head pressures must be overcome. Valves with nipples having proper venturi ratios and chamfers and with inlets tied together, higher flow rates can be obtained using two or three stage configurations. Furthermore, it should be noted that when pump/valve 202 is in the By-pass position and no suction pressure is being created in conduit 200, the position of the three-way valve 188 being irrelevant. However, when pump/valve 202 is in the Pump position, suction pressure is created in conduit 200 and the position of three-way valve 188 may be such as to fill, dispense, or maintain the concentrated liquid agrichemical.

Figure 15:
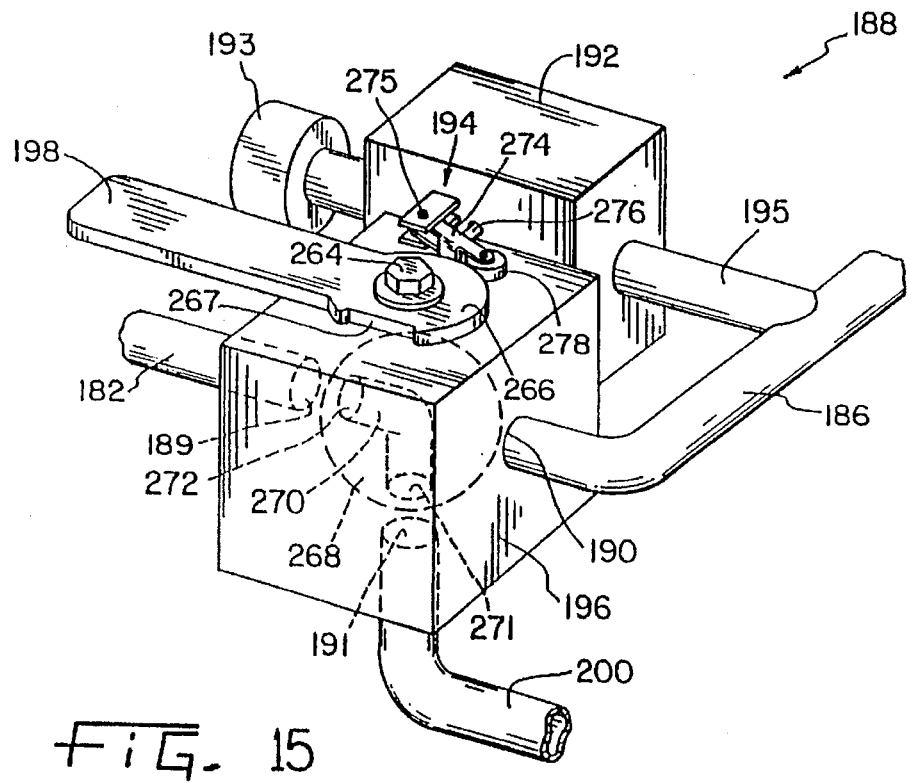
FIG. 15 is an enlarged elevational view of the 3-way valve of the system of FIG. 13, in a tank fill position with the vent closed.
Figure 16:
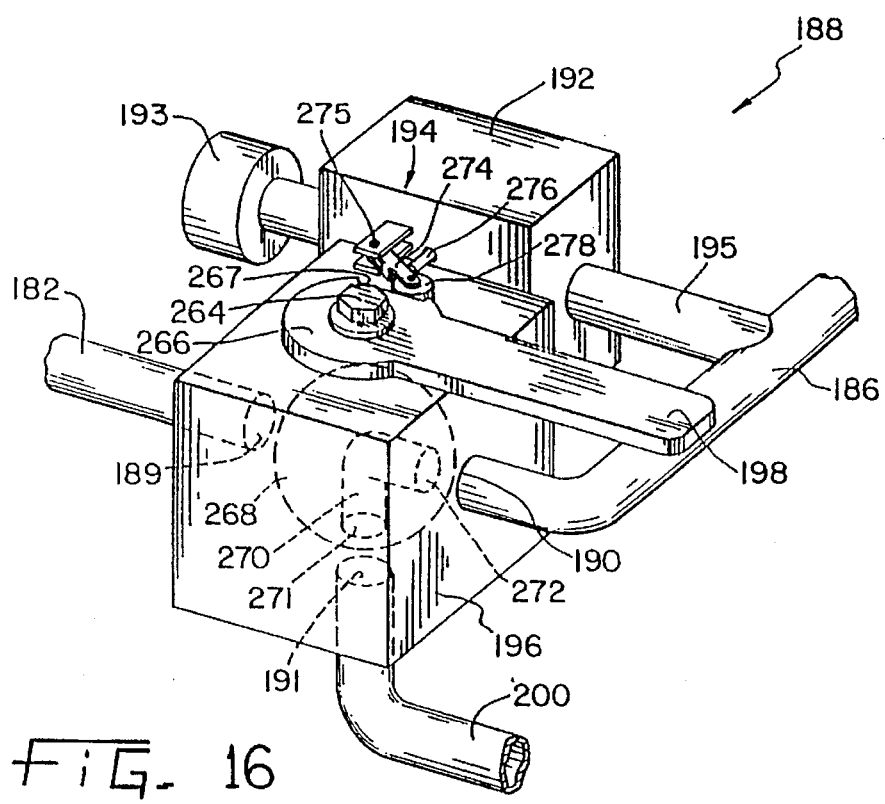
FIG. 16 is an enlarged elevational view of the 3-way valve of the system of FIG. 13, in a tank dispensing position with the vent open.

The operation of the embodiment of FIG. 13 will be described with reference to FIGS. 14–16. Three-way valve 188 includes a vent 192 which is actuated by a vent actuator 194. Vent actuator 194 consists of an arm 274 pivotally connected at 275 and a roller 278 at the end distal pivot 275. A pin 276 actuates vent 192 such that when actuated conduit 186 is in communication with the ambient atmosphere via conduit 195 and breather 193. Three-way valve 188 includes an internal ball 268 which is rotatable with handle 198 through a 180° range of motion which corresponds to three separate positions. Ball 268 includes an internal conduit 270 of a right angle configuration having an outlet 271 on one end and an outlet 272 on the other end thereof. Handle 198 and ball 268 rotate about a vertical axis through bolt 264 such that outlet 271 is always in communication with opening 191 of conduit 200. Thus, rotation of ball 268 by handle 198 selectively permits opening 272 to be in communication with either one of opening 189 of conduit 182, opening 190 of conduit 186, or neither opening 189, 190. It should be noted that handle 198 is so oriented that its position designates what conduit, if any, opening 272 is in communication with.

Vent actuator 194 works in conjunction with handle 198 in that handle 198 includes an annular portion 266 with a flat 267 located on one side thereof. In the Off position as depicted in FIG. 14, opening 272 of conduit 270 of ball 268 is in communication with no conduit while annular portion 266 of handle 198 is oriented so as to be pressed against pivot arm 274 such that pin 276 actuates vent 192 such that conduit 186 and thus, tank 175, is vented to atmosphere. In the Tank Fill position as depicted in FIG. 16, ball 268 is oriented such that opening 272 is in communication with opening 190 of conduit 186, while flat 267 of handle 198 is oriented toward vent actuator 194 such that vent actuator 194 is not actuated such that conduit 186 is not vented to atmosphere. In the Tank Dispense position as depicted in FIG. 15, ball 268 is oriented such that opening 272 is in communication with opening 189 of conduit 182, while annular portion 266 with handle 198 is oriented so as to be pressed against pivot arm 274 such that pin 276 actuates that 192 such that conduit 186 and thus, tank 175, is vented to atmosphere.

Figure 14:
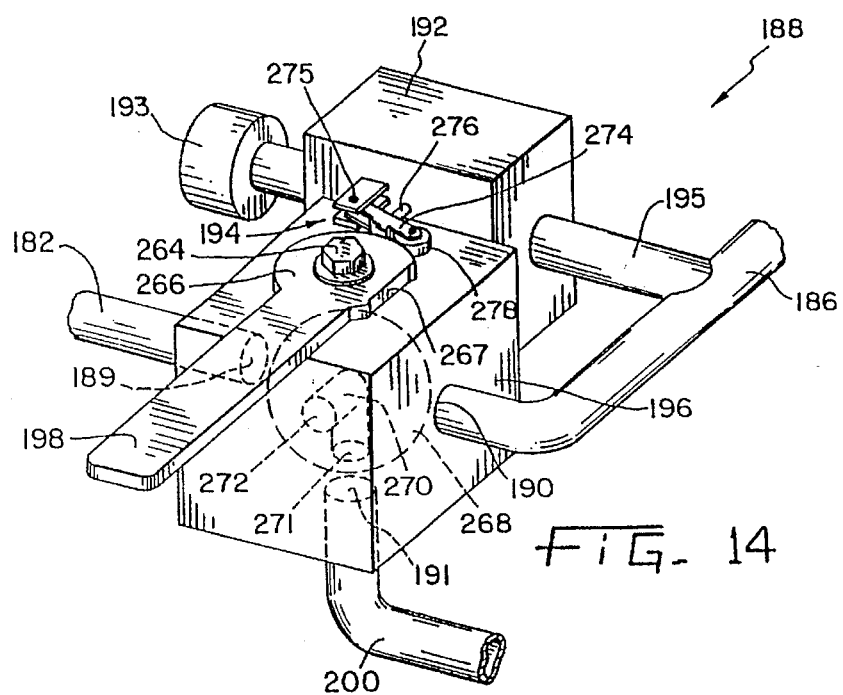
FIG. 14 is an enlarged elevational view of the 3-way valve of the system of FIG. 13, in an off position with the vent open.

In operation of the embodiment of FIG. 13, in order to measure a volume of liquid from tank 172, three-way valve 188 is initially in the Off position as depicted in FIG. 14 such that tank 175 is vented to atmosphere via conduit 186 and conduit 195. In order to create a suction pressure in conduit 200, pump P is turned on to start a flow of diluent from tank 206 through pump/valve 202. Pump/valve 202 is then actuated into the suction/pumping position thereby creating a suction pressure in conduit 200. At this point, the operator actuates three-way valve 188 to the Tank Fill position as depicted in FIG. 16 such that the suction pressure in conduit 200 is now being transmitted into conduit 186 and thus tank 175 in order to draw the liquid from tank 172 into tank 175. As described hereinabove, during the tank fill process, vent 192 is closed such that conduit 186 receives the suction pressure from conduit 200. Once the desired volume of chemical has been drawn into tank 175, three-way valve 188 is moved at least through the Off position as depicted in FIG. 14 which actuates vent 192 to cause conduit 186, and thus tank 175 to be vented to the prevailing atmosphere thereby relieving the suction pressure within tank 175.

At this point, the operator may either start to dispense the liquid from measuring vessel 174 or may hold the liquid therein by allowing three-way valve 188 to remain in the Off position, or may switch pump/valve 202 creating the suction pressure into the By-pass position. Additionally, pump P could also be shut down. When the operator is ready to dispense the liquid accumulated in tank 175, suction pressure is again created in conduit 200 by pump/valve 202 in the manner described hereinabove. Three-way valve 188 is then turned to the Tank Dispense position (FIG. 15) which maintains tank 175 at the prevailing atmospheric pressure through vent 192 in communication with tank 175 through conduits 186, 195. Suction pressure from conduit 200 is thus in communication with conduit 182, the outlet conduit of measuring vessel 174, which then draws the measured amount of liquid from tank 175 into three-way valve 188 and out conduit 200 to mix within chamber 252 of pump/valve 202 to then exit into conduit 216 and into tank 218 for eventual application.

FIGS. 20–24, 25A and 25B illustrate another embodiment of a measuring vessel assembly 300 which is similar to measuring vessel assembly 42 described supra. Measuring vessel assembly 300 includes a cylindrical main body 44 connected to a base portion 46 and top cap 64. Base portion 46 includes handles 47a, 47b for transporting measuring vessel assembly 300 and compressor 58 disposed within base portion 46. Compressor 58 is a single head compressor which creates a suction pressure at an inlet thereof and a positive pressure at an outlet thereof.

A valve head 72 is attached to top cap 64 and includes a three-position air valve 74 disposed therein. As described above, air valve 74 includes a VAC bore 118, PRES bore 119, TANK bore 120 and VENT bore 121 (FIGS. 9–12). VAC bore 118 is connected to vacuum line 76, PRES bore 119 is connected to pressure line 78, TANK bore 120 is connected to tank line 80, and VENT bore 121 is vented directly to the ambient environment. Inlet and outlet conduit 68, 70 are in fluid communication with an interior of cylindrical main body 44 via check valve 69, 71 at one end thereof, and are in fluid communication with inlet and outlet fittings 48, 52 at the other end thereof.

Figure 20:
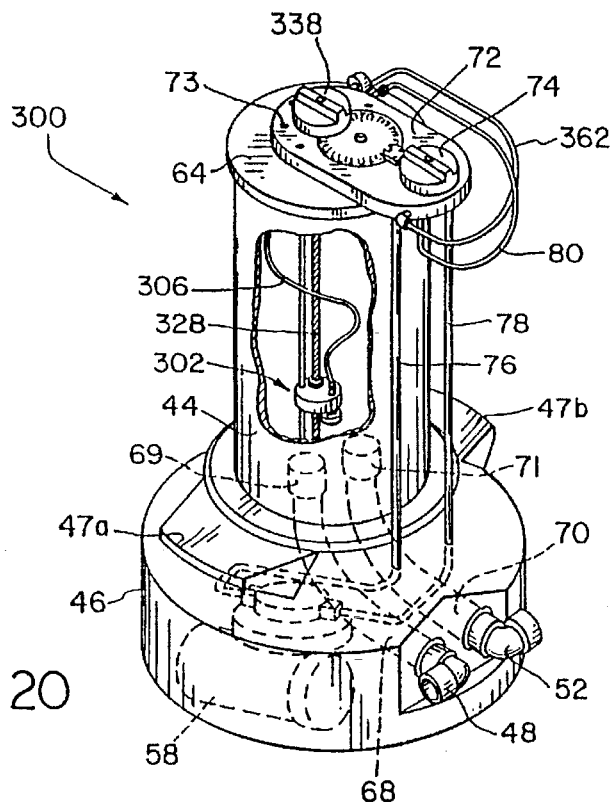
FIG. 20 is a partially cut-away perspective view of an embodiment of a measuring tank according to the present invention as utilized in the system of FIG. 2.

Measuring vessel assembly 300, as shown in FIG. 20, includes a shut-off device for automatically stopping the flow of concentrated liquid agrichemical which is drawn into measuring vessel assembly 300 from a storage tank when the liquid agrichemical is at a predetermined level within measuring vessel assembly 300. The flow of liquid agrichemical into measuring vessel assembly 300 is automatically stopped dependent upon suction pressure within vacuum line 76 and tank line 80. Because the shut-off device automatically stops the flow of liquid agrichemical when the liquid is at a predetermined level, visual monitoring of the fluid level within and manually stopping the flow of liquid into main body 44 is unnecessary. Accordingly, main body 44 need not be formed from an opaque material allowing visual observation of the fluid level within main body 44.

In the embodiment shown in FIG. 20, the shutoff device comprises a float assembly 302 (FIGS. 20 and 24) having an opening 304 formed therein which is in fluid communication with tank line 80 via flexible tube 306. More specifically, opening 304 is formed in and extends through block 308. A first enlarged diameter portion 310 is disposed at the top end of opening 304 and includes female threads for receiving a coupler 312. A second enlarged diameter portion 314 is disposed at the bottom end of block 308 and receives a valve seat 316 having an opening 318 which is in fluid communication with opening 304. A bracket 320 is attached to block 308 and pivotally mounts float 322 via arm 324. Headed pin 326 is attached to arm 324 and seals opening 318 when arm 324 is pivoted as a result of upward movement of float 322. That is, as liquid agrichemical being drawn into main body 44 reaches a predetermined level, float 322 moves in an upward direction and causes headed pin 326 to close opening 318.

Float assembly 302 is preferably positioned generally coaxial with the longitudinal axis of main body 44. More particularly, float 322 of float assembly 302 is preferably positioned generally coaxial with the longitudinal axis of main body 44. Such coaxial alignment of float assembly 302 within main body 44 provides an equivalent of a self-leveling feature, whereby manual leveling of measuring vessel assembly 300 is not required. In furtherance thereof, it is noted that if float 322 is positioned generally coaxial with the longitudinal of main body 44, the average level of fluid within main body 44 is substantially equal to the level of fluid existing at float 322. That is, a higher level of fluid on one side of main body 44 results in a correspondingly lower level of fluid on the opposite side of main body 44, with a resultant average fluid level existing at the longitudinal axis of main body 44. Thus, by positioning float assembly 302 generally coaxial with the longitudinal axis of main body 44, leveling of measuring vessel assembly 300 is not required.

Block 308 of float assembly 302 is threadingly attached to a threaded rod 328 and moves in an upward or downward direction during rotation of threaded rod 328, described infra. More particularly, block 308 includes an opening 330 which receives an insert 332 having a bore 334 with female threads therein. Insert 332 may be attached to block 308 via one or more screws 336.

Figure 21:
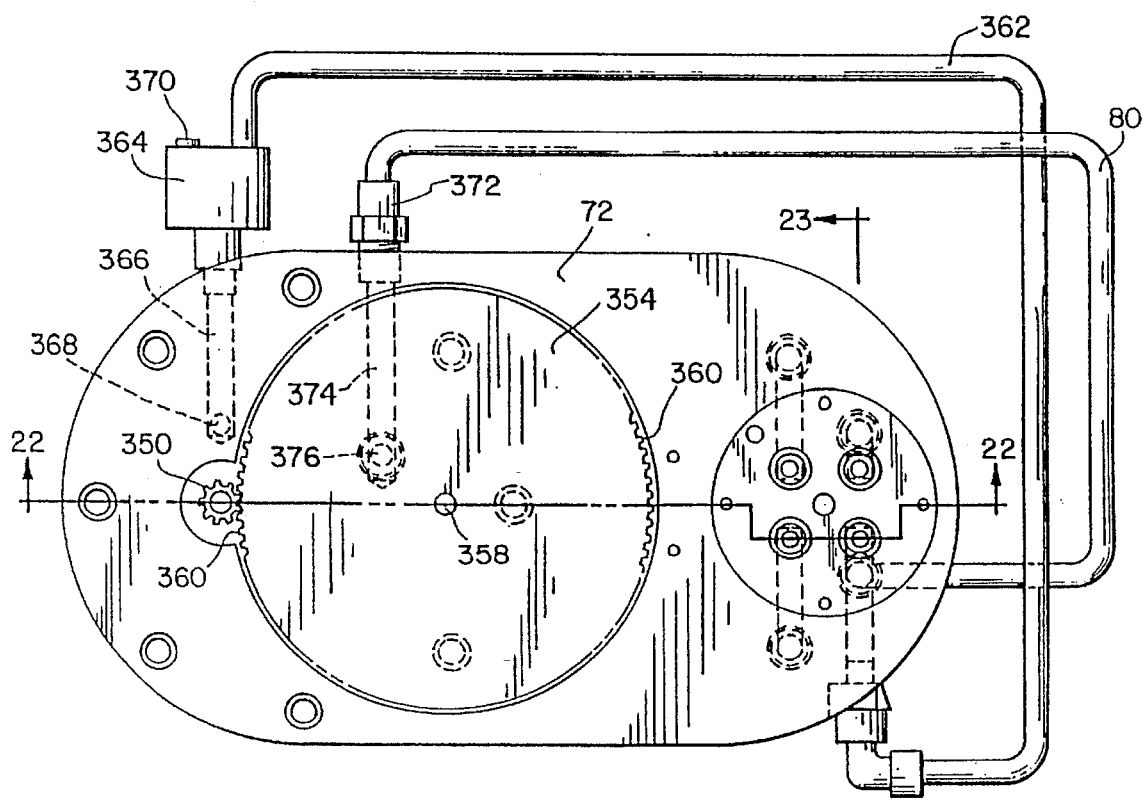
FIG. 21 is a top plan view of the distribution head of the measuring tank of FIG. 20.

Referring now to FIGS. 20-22, an adjustment knob 338 is non-rotatably attached to threaded rod 328 and is disposed adjacent valve head 72. A seal 340 is disposed within an enlarged diameter portion 342 formed in valve head 72 for providing a gas-tight seal therebetween. In the embodiment shown, adjustment knob 338 includes an opening 334 formed therein for receiving threaded rod 328. Threaded rod 328 receives a locknut 346. Disposed between adjustment knob 338 and valve head 72, and non-rotatably attached to threaded rod 328 is a gear 348 having a plurality of radially extending teeth 350 (FIGS. 21, 22). It is to be understood, however, that gear 348 may be monolithically formed with adjustment knob 338.

Valve head 72 includes a recess 352 formed in the top surface thereof for receiving a visual indicator dial 354. Indicator dial 354 includes a centrally disposed opening 356 having a diameter which is slightly larger than bolt 358. Thus, indicator dial 354 is rotatably mounted to valve head 72. Indicator dial 354 includes a plurality of radially extending teeth 360 disposed at the periphery thereof, a portion of which are shown in FIG. 21. Teeth 360 mate with teeth 350 of gear 348, whereby rotational movement of adjustment knob 338 results in rotational movement of indicator dial 354. Conversely, rotational movement of indicator dial 354 results in rotational movement of gear 348 and threaded rod 328. Thus, rotational movement of threaded rod 328 is dependent upon rotational movement of indicator dial 354.

During a filling operation of measuring assembly vessel 300, tank line 80 is fluidly connected to vacuum line 76 by adjustment of valve 74. Liquid agrichemical flows into main body 44 via inlet conduit 68. When the level of the liquid agrichemical reaches float 322, float 322 moves in an upward direction and rotates arm 324, thereby closing opening 304 which is in fluid communication with flexible tube 306, tank line 80 and vacuum line 76. However, a negative pressure is still present within main body 44 above the liquid agrichemical because of the vacuum pressure created therein utilizing air compressor 58. The level of liquid agrichemical within main body 44 therefore continues to rise after closing of opening 304. To prevent liquid agrichemical from rising above the predetermined level, it is necessary to quickly vent the interior of measuring vessel assembly 300 to the ambient environment when the liquid agrichemical reaches the predetermined level. The embodiment as shown in FIGS. 20–24, 25a and 25b automatically vents the interior of measuring vessel assembly 300 to the ambient environment when opening 304 is closed by headed pin 326.

During a filling operation of measuring vessel assembly 300, suction pressure created within vacuum line 76, tank line 80 and flexible tube 306 is approximately minus 8–12 inches mercury because of the suction pressure created by air compressor 58. When opening 304 is closed by headed pin 326 of float assembly 302, air compressor 58 continues to run and the suction pressure within vacuum line 76, tank line 80, and flexible tube 306 decreases to less than minus 20 inches mercury. The embodiment shown in FIG. 20 includes a pressure sensing line 362 which is in fluid communication with tank line 80 at one end thereof. As best seen in FIG. 21, pressure sensing line 362 is connected at the other end thereof to a pressure equalizing valve 364. Pressure equalizing valve 364 is threadingly received in a passageway 366 formed in valve head 72. Passageway 366 is, in turn, in fluid communication with the interior of measuring vessel assembly 300 via an opening 368 extending from the bottom of valve 72 to passageway 366.

Pressure equalizing valve 364 may be, e.g., a piston-type or diaphragm-type relief valve Which provides fluid communication between passageway 366 and the ambient environment via inlet 370, dependent on the suction pressure within pressure sensing line 362. An example of a pressure relief valve which may be utilized with the present invention is a diaphragm-type valve available from R & K Industries, Ontario, Calif., part No. VCV181E. In general, such a valve does not provide communication between the ambient environment and passageway 366 when the pressure within the valve is at about minus 15 inches mercury or above, and does provide fluid communication between the ambient environment and passageway 366 when the pressure within pressure sensing line 362 is below about minus 15 inches mercury.

Tank line 80, as shown in FIG. 21, is attached to a coupler 372 which is threadingly received within a passageway 374 formed in valve head 372. Passageway 374 is in fluid communication with the interior of measuring vessel assembly 300 via an opening 376 which extends from the bottom of valve head 72 to passageway 374. Referring to FIG. 22, opening 376 threadingly receives a coupling 78 which is attached to flexible tube 36.

Moreover, pressure sensing line 362 is attached at one end thereof to a coupling 380 which is threadingly received within a passageway 382 disposed in fluid communication with tank line 80.

Figure 25A:
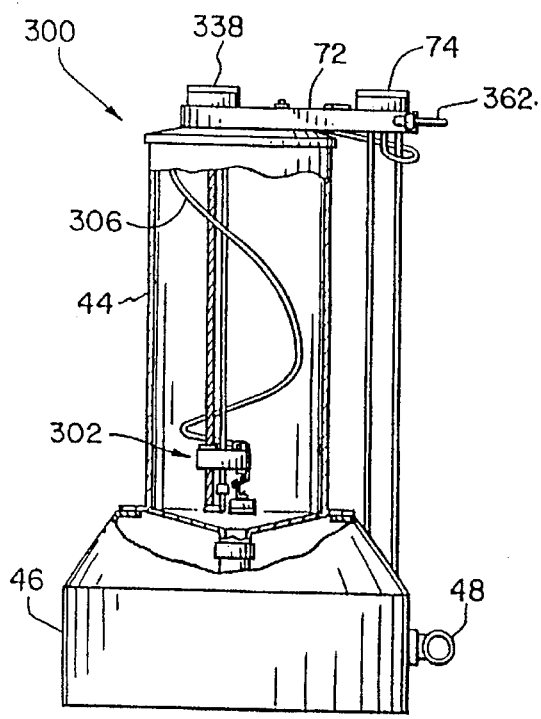
FIGS. 25A and 25B are partially cut-away perspective views of the embodiment of FIG. 20, illustrating the float assembly in a downward position and upward position, respectively.
Figure 25B:
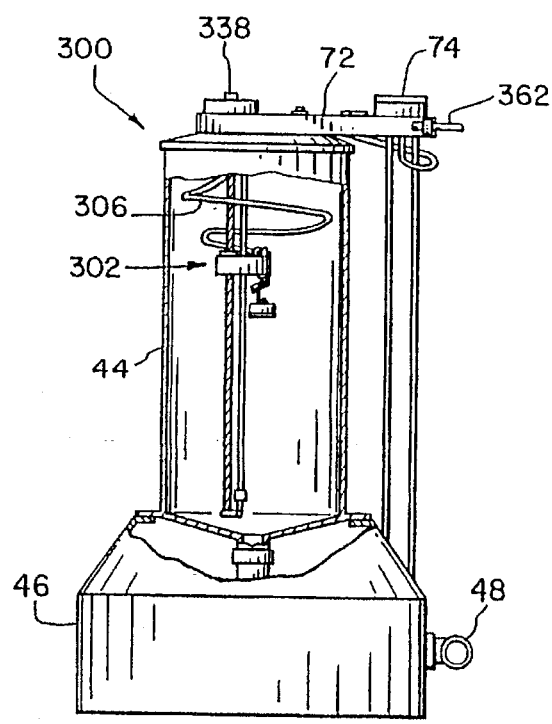

FIGS. 25a and 25b illustrate the relative orientation of flexible tube 306 when float assembly 302 is moved to a downward position (FIG. 25a) and an upward position (FIG. 25b). As may be seen, flexible tube 306 resiliently deforms during upward and downward movement of float assembly 302 and maintains structural integrity.

FIGS. 26–37 illustrate another embodiment of a measuring vessel assembly, generally designated 400, which is similar to measuring vessel assemblies 42 and 300, and includes a cylindrical main body 44 connected to a base portion 46 and a top cap 64. Base portion 46 includes handles 47a, 47b for transporting measuring vessel assembly 400. A two-head compressor 402 disposed within base portion 46 includes a first head 404 and a second head 406. First head 404 includes an inlet 408 and an outlet 410. Likewise, second head 406 includes an inlet 413 and an outlet 414. First head 404 is utilized for applying a positive pressure to the interior of main body 44 via outlet 410, and second head 406 is utilized for applying a negative pressure to main body 44 via inlet 413.

Measuring vessel assembly 400, similar to measuring vessel assembly 300 shown in FIG. 20, includes a shut off device for automatically stopping the flow of concentrated liquid agrichemical which is drawn into measuring vessel assembly 400 from a storage tank when the liquid agrichemical is at one of a plurality of predetermined levels within measuring vessel assembly 400. To wit, as described above with regard to measuring vessel assembly 300, measuring vessel assembly 400 disclosed in FIGS. 26–37 likewise includes a float assembly 302 as shown in FIGS. 20, 22 and 24. Referring to FIGS. 22, 24, 28 and 29, conjunctively, float assembly 302 includes a flexible tube 306 attached to a coupling 378, which in turn is connected to an opening 416 in valve head 412. Moreover, a threaded rod 328 passes through an opening 418 having an enlarged diameter portion 420 for receiving a seal (not shown).

Figure 26:
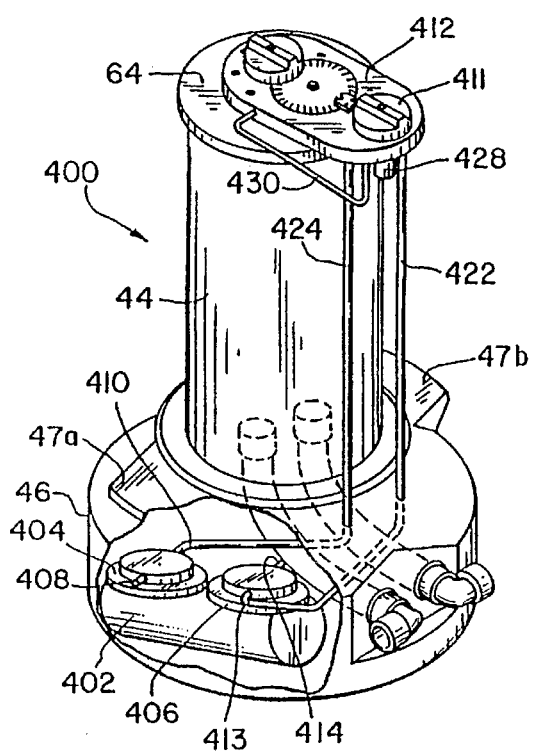
FIG. 26 is a partially cut-away perspective view of another embodiment of a measuring vessel assembly according to the present invention as utilized in the system of FIG. 2.
Figure 27:
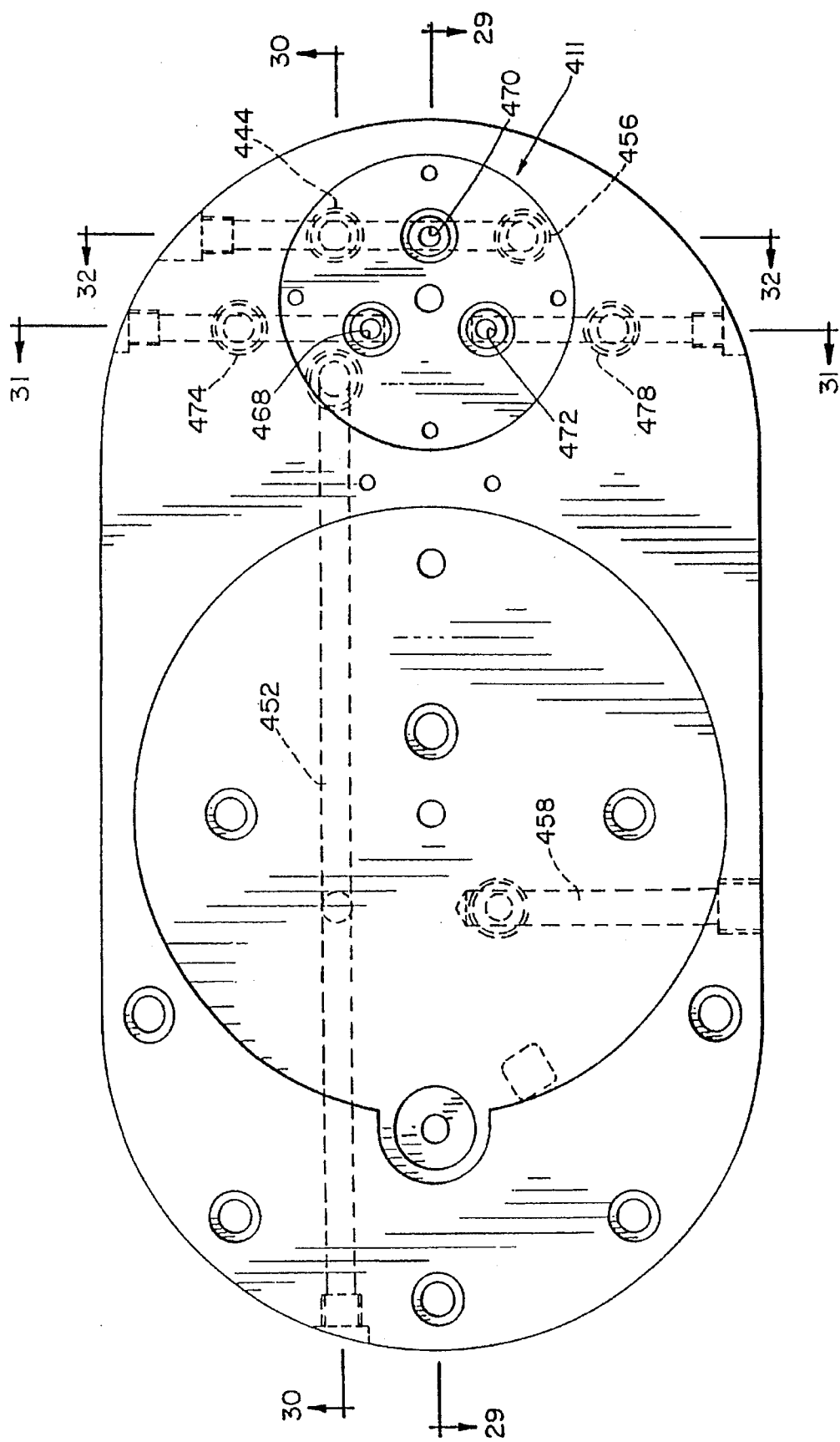
FIG. 27 is a top plan view of the valve head of the measuring vessel assembly of FIG. 26.
Figure 28:
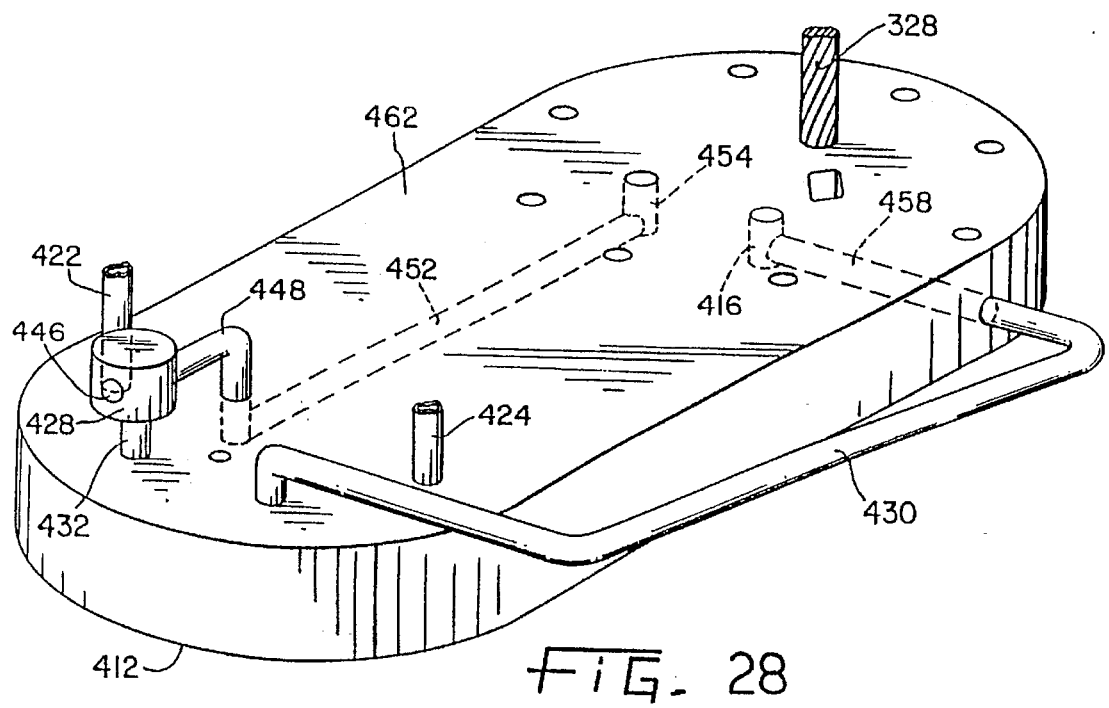
FIG. 28 is a perspective view of the valve head of FIGS. 26 and 27, as viewed when flipped upside down.
Figure 29:
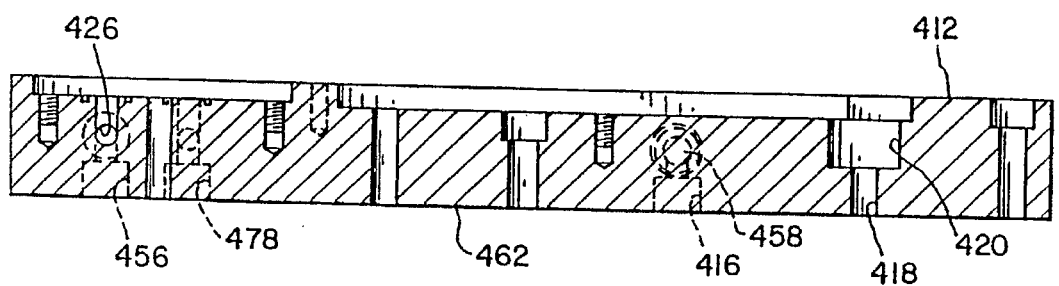
FIG. 29 is a sectional view of the valve head of FIG. 27 taken along line 29—29 thereof.

Referring to FIG. 27, a perspective view of valve head 412 is shown, with valve head 412 in an inverted, i.e., up side down, position. As described infra, valve head 412 includes a single three-port valve 411 for application of a positive or negative pressure within main body 44. A vacuum port 468 is in fluid communication with a vacuum line 422 which is connected to and in fluid communication with inlet 413 of second head 406 of compressor 402. A pressure port 472 of three-port valve 411 is in fluid communication with a pressure line 424 which is connected to outlet 410 of first head 404 of compressor 402. A tank port 470 of three-port valve 411 is connected to a transversely extending channel 426 (FIG. 29), which in turn is in fluid communication with a pressure equalizing valve 428 (FIGS. 26, 27) and a tank line 430.

Figure 30:
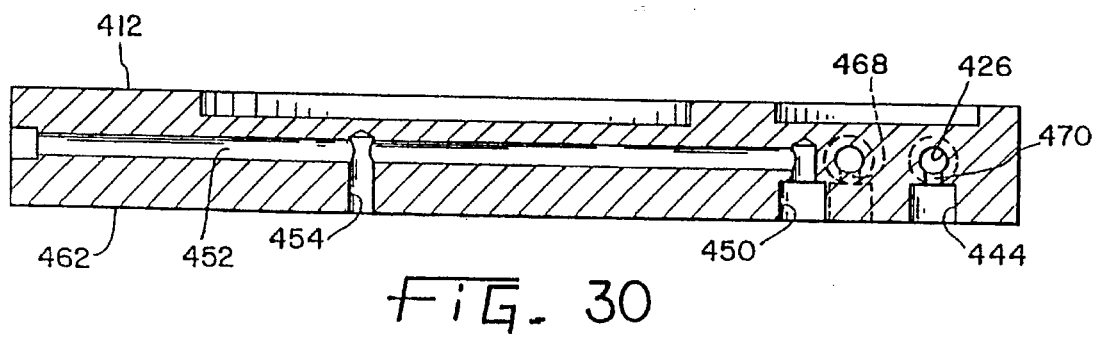
FIG. 30 is a sectional view of the valve head of FIG. 27 taken along line 30—30 thereof.
Figure 31:
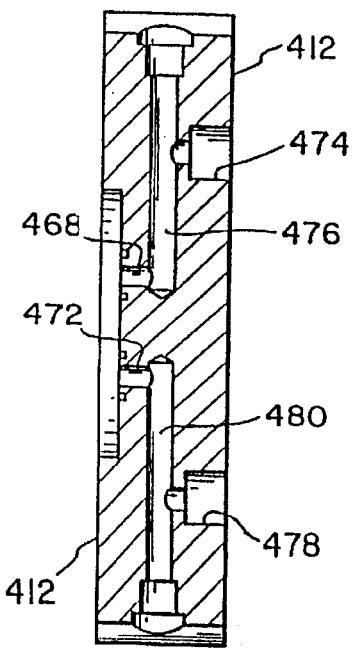
FIG. 31 is a sectional view of the valve head of FIG. 27 taken along line 31—31 thereof.
Figure 32:
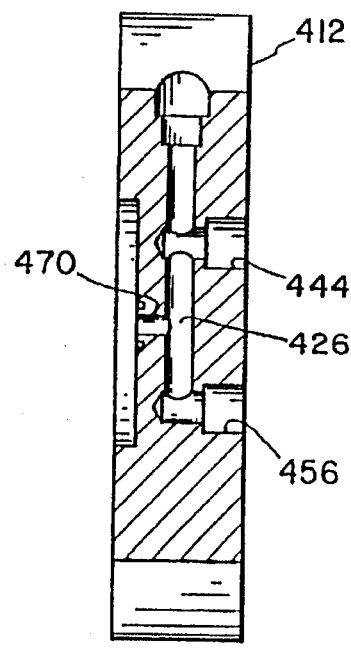
FIG. 32 is a sectional view of the valve head of FIG. 27 taken along line 32—32 thereof.

Pressure equalizing valve 428 includes a hollow stem portion 432 which is threadingly received within an opening 444 of valve head 412 (FIGS. 30, 32). Pressure equalizing valve 428 also includes a first opening 446 which opens directly to the atmosphere and a second opening (not numbered) which is attached to pipe 448. At the opposite end of pipe 448 is connected to an opening 450 (FIG. 30) in valve head 412. Opening 450 is in fluid communication with a longitudinally extending channel 452, which is in fluid communication with an opening 454 extending to the bottom side of valve head 412.

As described above with regard to the embodiment shown in FIGS. 20–25, pressure equalizing valve 428 opens and closes the fluid flow path from first opening 446 to pipe 448, dependent upon the pressure within hollow stem portion 432. More particularly, pressure equalizing valve 428 effects fluid communication between first opening 446 and pipe 448 when a pressure is less than about −15 inches mercury within hollow stem portion 432.

Tank line 430 is connected at one end thereof to an opening 456 (FIGS. 29, 32) extending to transversely extending channel 426. Tank line 430 is connected at the opposite end thereof to a bore 458, which in turn is in fluid communication with bore 416 extending to the bottom surface 462 of valve head 412.

Vacuum line 422 is connected at one end thereof to an opening 474 (FIG. 31) and is in fluid communication with vacuum bore 468 via transversely extending bore 476. Vacuum line 422 is connected at the opposite end thereof to inlet 413 of second head 406 of compressor 402.

Pressure line 424 is connected at one end thereof to an opening 478 (FIG. 31) formed in valve head 412 and is in fluid communication with pressure port 472 via transversely extending bore 480. Pressure line 424 is connected at the opposite end thereof to outlet 410 of first head 404 of compressor 402.

An advantage of using a two-head compressor 402, such as disclosed in FIG. 26, is that two heads with differing volumetric flow rates can be utilized for a specific application, if desirable. For example, it is readily apparent from an examination of FIG. 26 that two-head compressor 402 includes a single electric motor which rotatably drives each of first head 404 and second head 406. It is known that greater horse power is required to operate a head providing a positive pressure output to the interior of main body 44, and lesser horse power is required to drive a head providing suction pressure to the interior of main body 44. Thus, assuming the electric motor has a generally constant power output, second head 406 providing negative pressure to main body 44 may be sized larger than first head 404 providing positive pressure to the interior of main body 44. Such increase in size of second head 406 results in a higher volumetric flow rate of liquid into measuring vessel assembly 400, and a decrease in the total amount of time required to draw the liquid into and dispense the liquid from measuring vessel 400.

Figure 33:
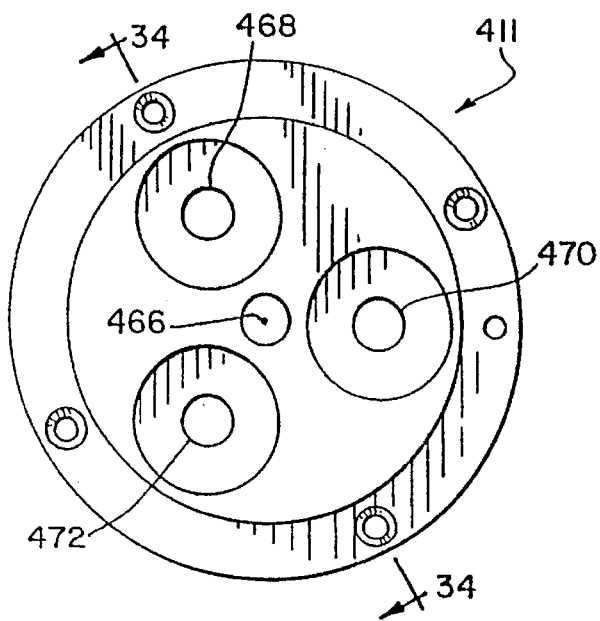
FIG. 33 is a top sectional view of the air valve assembly of FIG. 27.
Figure 34:
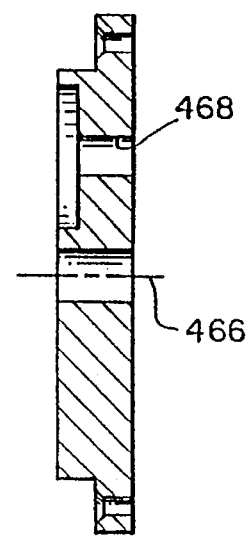
FIG. 34 is a sectional view of the air valve assembly of FIGS. 27 and 33, taken along line 34—34 in FIG. 33.

FIGS. 33 and 34 illustrate three-port valve 411 shown in FIGS. 26 and 27 in greater detail. A valve manifold of a type similar to that disclosed in FIG. 8 includes a channel 464 which rotates about an axis of rotation 466. Depending upon the particular orientation of the valve manifold, channel 464 can be selectively positioned to provide communication between tank port 470 and either vacuum port 468 or pressure port 472.

Figure 35:
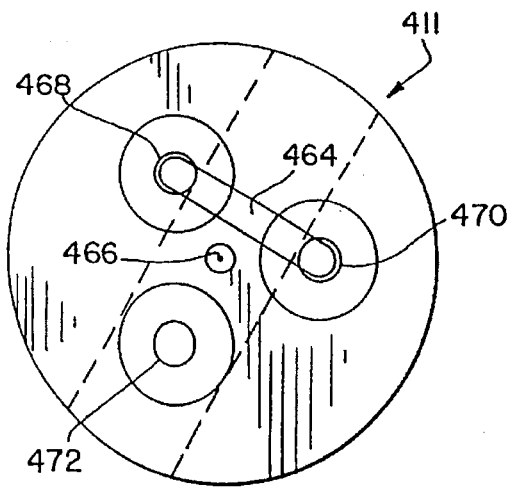
FIG. 35 is a top sectional view of the valve assembly of FIG. 33 in a tank fill position.

FIG. 35 schematically illustrates the fluid flow path of three-port valve 411 when in a tank filling position. When the valve manifold is in a tank filling position, channel 464 effects fluid communication between vacuum port 468 and tank port 470.

Figure 36:
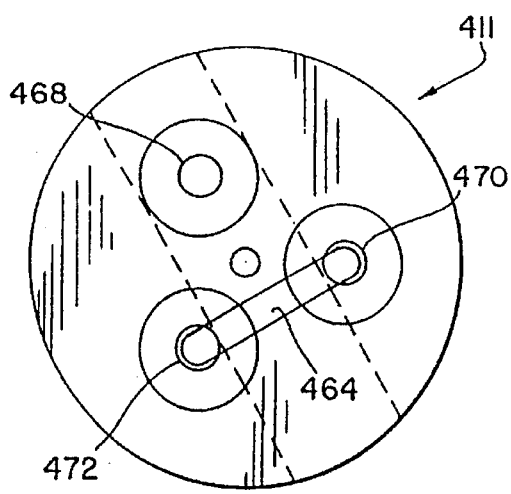
FIG. 36 is a top sectional view of the valve assembly of FIG. 33 in a tank fill position.

FIG. 36 illustrates a sectional view of the three-port valve when oriented in a tank dispensing position. As may be seen, channel 464 is disposed to effect fluid communication between tank port 470 and pressure port 472.

Figure 37:
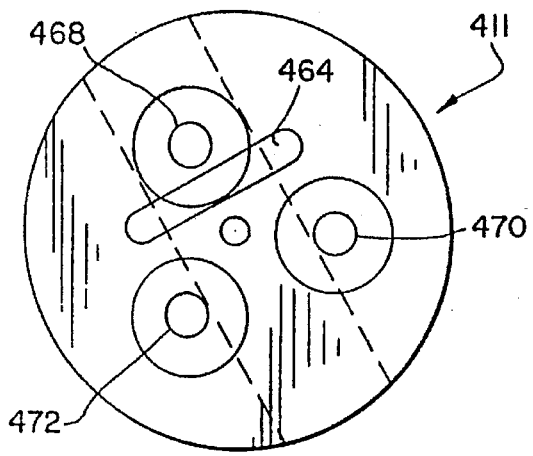
FIG. 37 is a top sectional view of the valve assembly of FIG. 33 in an off position.

FIG. 37 illustrates the three-port valve 411 when in an off position. As is apparent, channel 464 is positioned such that fluid communication between any of vacuum port 468, tank port 470 and pressure port 472 is prevented.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for drawing a desired measured volume of liquid agrichemical from a bulk tank and dispensing the measured volume for mixing a diluent, the apparatus comprising:

a measuring vessel of a predetermined volume, said measuring vessel having a fluid inlet adapted for fluid communication with the bulk tank, and a fluid outlet;

means for defining an air passage which is disposed in fluid communication with an interior of said measuring vessel;

an air compressor for creating a suction pressure and a positive pressure; and a valve disposed between and in fluid communication with said air passage and said air compressor, said valve selectively applying one of said suction pressure and said positive pressure to said air passage, the liquid agrichemical drawn into said measuring vessel from the bulk tank via said fluid inlet during application of said suction pressure; and a shut-off device for automatically stopping a flow of the liquid agrichemical drawn into said measuring vessel when the liquid agrichemical is at one of a plurality of selected predetermined levels within said measuring vessel.

2. An apparatus for drawing a desired measured volume of liquid chemical from a bulk tank and dispensing the measured volume for mixing with a diluent, the apparatus comprising:

a measuring vessel of a predetermined volume, said measuring vessel having a fluid inlet adapted for fluid communication with the bulk tank, and a fluid outlet;

an air pump mechanism having a suction inlet connected to an interior of said vessel and a positive pressure outlet connected to the interior of said vessel;

a valve mechanism connected between the vessel interior and said air pump mechanism to selectively connect the vessel interior to either the pump inlet or outlet;

a suction inlet in the vessel connected to said pump inlet through said valve mechanism; and an adjustable preset shut-off device including a sensing element responsive to liquid level in said vessel, said shut-off device connected to close said suction inlet when actuated, the vertical position of said sensing element in said vessel being adjustable.

3. The apparatus of claim 2, wherein said shut-off device comprises a float assembly having an opening therein, and a flexible tube connected to and in fluid communication with each of said suction inlet in said vessel and said float assembly opening, said float assembly positioned at a selected location within said measuring vessel, said sensing element comprising a float which is movable in a vertical direction and closes said float assembly opening when contacted by said liquid agrichemical.

4. The apparatus of claim 3, wherein said float assembly is disposed generally coaxial with a longitudinal axis of said measuring vessel.

5. The apparatus of claim 3, wherein said shut-off device comprises a rotatable visual indicator dial and a threaded rod extending into said vessel, said threaded rod connected to said visual indicator dial, said float assembly attached to said threaded rod and moving in an upward or downward direction during said rotation of said threaded rod.

6. The apparatus of claim 5, wherein said visual indicator dial provides an indication of a set predetermined level of liquid agrichemical.

7. The apparatus of claim 2, wherein said shut-off device further comprises a pressure equalizing valve disposed in fluid communication with said interior of said measuring vessel and the ambient, said pressure equalizing valve effecting fluid communication between said measuring vessel interior and the ambient when said shut-off device is actuated.

* * * * *